US011663683B2

(12) United States Patent
Mimassi

(10) Patent No.: US 11,663,683 B2
(45) Date of Patent: May 30, 2023

(54) SYSTEM AND METHOD FOR IMAGE-BASED FOOD ITEM, SEARCH, DESIGN, AND CULINARY FULFILLMENT

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/695,679

(22) Filed: Mar. 15, 2022

(65) Prior Publication Data

US 2022/0198586 A1  Jun. 23, 2022

Related U.S. Application Data

(63) Continuation-in-part of application No. 17/005,012, filed on Aug. 27, 2020, now Pat. No. 11,276,129, (Continued)

(51) Int. Cl.
*G06N 20/20* (2019.01)
*G06Q 30/02* (2023.01)
(Continued)

(52) U.S. Cl.
CPC ............. *G06Q 50/12* (2013.01); *G06F 16/56* (2019.01); *G06N 20/20* (2019.01);
(Continued)

(58) Field of Classification Search
CPC ............. G06Q 50/12; G06Q 30/0281; G06Q 30/0621; G06Q 30/0631; G06Q 50/01;
(Continued)

(56) References Cited

U.S. PATENT DOCUMENTS 6,301,564 B1 * 10/2001 Halverson .............. G06Q 50/12
705/15
6,370,513 B1 * 4/2002 Kolawa .................. G06Q 30/02
705/7.33
(Continued)

FOREIGN PATENT DOCUMENTS

CA  3038559 A1 * 9/2020 ..... G06Q 10/063112
CN  104731846 A  * 6/2015

OTHER PUBLICATIONS

Vivek, M. B., N. Manju, and M. B. Vijay. "Machine Learning Based Food Recipe Recommendation System." Proceedings of International Conference on Cognition and Recognition. Singapore: Springer Singapore, 2017. 11-19. Web. (Year: 2017).*
(Continued)

*Primary Examiner* — Ashford S Hayles
(74) *Attorney, Agent, or Firm* — Galvin Patent Law LLC; Brian R. Galvin

(57) ABSTRACT

A system and method for image-based personalized food item search, design, and culinary fulfillment. The system is a cloud-based network comprising a food image engine, a prediction engine, a food item design engine, and portals for restaurants and patrons to enter their information. The system may receive as an input a food item image, perform image recognition on the food item image to identify a target food item, use the identified target food item to predict an ingredient list for the target food item, and generate personalized target food item recommendations for patrons based on a multitude of variables associated with the business enterprises, patrons historic culinary transactions, dietary needs and preferences both explicit and inferred. The system may be accessed through web browsers or purpose-built computer and mobile phone applications.

14 Claims, 19 Drawing Sheets

Related U.S. Application Data which is a continuation-in-part of application No. 16/993,488, filed on Aug. 14, 2020, now abandoned.

(60) Provisional application No. 62/984,237, filed on Mar. 2, 2020, provisional application No. 62/956,289, filed on Jan. 1, 2020.

(51) Int. Cl.
*G06Q 50/12* (2012.01)
*G06F 16/56* (2019.01)
*G06Q 30/0601* (2023.01)

(52) U.S. Cl.
CPC ..... *G06Q 30/0281* (2013.01); *G06Q 30/0621* (2013.01); *G06Q 30/0631* (2013.01)

(58) Field of Classification Search
CPC ......... G06Q 10/0832; G06Q 10/08355; G06Q 30/0635; G06Q 10/06312; G06F 16/56; G06N 20/20
See application file for complete search history.

(56) References Cited

U.S. PATENT DOCUMENTS

| | | | |
|---|---|---|---|
| 6,980,999 B1* | 12/2005 | Grana | G06Q 30/02 600/300 |
| 8,732,101 B1* | 5/2014 | Wilson | G06Q 30/0269 706/15 |
| 9,639,805 B1* | 5/2017 | Feller | G06F 40/30 |
| 9,659,225 B2 | 5/2017 | Joshi et al. | |
| 10,733,479 B2 | 8/2020 | Tran et al. | |
| 10,861,076 B1* | 12/2020 | Neumann | G06N 20/00 |
| 11,164,478 B2 | 11/2021 | Pichara et al. | |
| 2001/0021914 A1* | 9/2001 | Jacobi | G06Q 30/0641 705/26.1 |
| 2002/0004749 A1* | 1/2002 | Froseth | G06Q 50/00 705/16 |
| 2002/0029162 A1* | 3/2002 | Mascarenhas | G06Q 30/0203 707/E17.109 |
| 2003/0091964 A1* | 5/2003 | Yeager | G06Q 30/02 708/133 |
| 2006/0026048 A1* | 2/2006 | Kolawa | G06Q 10/063 705/7.11 |
| 2009/0077007 A1* | 3/2009 | Schwarzberg | G06Q 30/02 |
| 2010/0003647 A1* | 1/2010 | Brown | G09B 19/0092 434/127 |
| 2010/0292998 A1* | 11/2010 | Bodlaender | G16H 20/60 705/2 |
| 2011/0208617 A1* | 8/2011 | Weiland | G06Q 30/0641 705/27.1 |
| 2011/0318717 A1* | 12/2011 | Adamowicz | G16H 20/60 434/127 |
| 2012/0094258 A1* | 4/2012 | Langheier | G16H 20/30 434/127 |
| 2012/0095863 A1* | 4/2012 | Schiff | G06Q 30/0282 705/26.7 |
| 2012/0136864 A1* | 5/2012 | Ochtel | G06Q 30/0633 707/738 |
| 2012/0226698 A1* | 9/2012 | Silvestre | G06Q 30/02 707/E17.084 |
| 2012/0259657 A1* | 10/2012 | Keynan | G16Z 99/00 705/2 |
| 2013/0030944 A1* | 1/2013 | Nicod | G06Q 30/0281 705/26.5 |
| 2013/0080438 A1* | 3/2013 | Tompkins | G06Q 30/0282 707/740 |
| 2013/0085345 A1* | 4/2013 | Geisner | G06Q 30/00 600/300 |
| 2013/0108993 A1* | 5/2013 | Katz | G09B 23/28 434/127 |
| 2013/0113933 A1* | 5/2013 | Boushey | A23L 33/30 348/143 |
| 2013/0185646 A1* | 7/2013 | Wiggins | H04L 67/62 715/739 |
| 2013/0211948 A1* | 8/2013 | Lipscher | H04L 67/10 705/26.5 |
| 2013/0222406 A1* | 8/2013 | Wolfe | G06Q 30/0241 345/582 |
| 2013/0224694 A1* | 8/2013 | Moore | G09B 19/0092 434/127 |
| 2013/0339348 A1* | 12/2013 | Pickelsimer | G06Q 30/0631 707/723 |
| 2014/0012794 A1* | 1/2014 | Dillon | G06N 5/02 706/46 |
| 2014/0074650 A1* | 3/2014 | Elias | G06Q 30/0631 705/26.7 |
| 2014/0080102 A1* | 3/2014 | Krishna | G09B 19/0092 434/127 |
| 2014/0104385 A1* | 4/2014 | Wong | G06Q 30/016 382/110 |
| 2014/0214746 A1* | 7/2014 | Song | G06N 5/02 706/46 |
| 2014/0220516 A1* | 8/2014 | Marshall | G16H 20/60 434/127 |
| 2014/0229498 A1* | 8/2014 | Dillon | H04L 67/306 707/767 |
| 2014/0287384 A1* | 9/2014 | Boyes | G09B 5/02 434/127 |
| 2014/0324624 A1* | 10/2014 | Ward | H04W 4/021 705/26.7 |
| 2014/0344953 A1* | 11/2014 | Roundtree | G06Q 30/0242 726/28 |
| 2015/0199776 A1* | 7/2015 | Gluck | G06Q 30/0261 705/15 |
| 2015/0228062 A1* | 8/2015 | Joshi | G06Q 50/12 382/110 |
| 2015/0276700 A1* | 10/2015 | Goel | G01N 33/02 73/865.7 |
| 2016/0063734 A1* | 3/2016 | Divakaran | G06V 10/50 382/110 |
| 2016/0350715 A1* | 12/2016 | Minvielle | G01N 33/02 |
| 2018/0033074 A1* | 2/2018 | Grueneberg | G06Q 30/0633 |
| 2019/0163710 A1* | 5/2019 | Haghighat Kashani | G06F 16/9538 |
| 2019/0213914 A1* | 7/2019 | Vallance | G09B 19/0092 |
| 2019/0228855 A1* | 7/2019 | Leifer | G06N 20/10 |
| 2019/0228856 A1* | 7/2019 | Leifer | G16H 10/60 |
| 2020/0019861 A1* | 1/2020 | Jeong | G06F 16/951 |
| 2020/0034758 A1* | 1/2020 | Byron | G06N 20/00 |
| 2020/0154948 A1* | 5/2020 | Grass | A47J 43/04 |
| 2021/0074403 A1* | 3/2021 | Neumann | G16H 50/20 |
| 2022/0028526 A1* | 1/2022 | Neumann | G16H 10/60 |
| 2022/0171933 A1* | 6/2022 | Neumann | G06F 16/9035 |

OTHER PUBLICATIONS

T. Mokdara, P. Pusawiro and J. Harnsomburana, "Personalized Food Recommendation Using Deep Neural Network," 2018 Seventh ICT International Student Project Conference (ICT-ISPC), Nakhonpathom, Thailand, 2018, pp. 1-4, doi: 10.1109/ICT-ISPC.2018.8523950. (Year: 2018).*

Chen, Meng et al. "Eating Healthier: Exploring Nutrition Information for Healthier Recipe Recommendation." Information processing & management 57.6 (2020): 102051-. Web. (Year: 2020).*

Gao, X., Feng, F., He, X., Huang, H., Guan, X., Chong, F., Tat-Seng Chua. (2019). Hierarchical attention network for visually-aware food recommendation. Ithaca: Cornell University Library, arXiv. org. (Year: 2019).*

H. Abdool, A. Pooransingh and Y. Li, "Recommend My Dish: A multi-sensory food recommender," 2015 IEEE Pacific Rim Conference on Communications, Computers and Signal Processing (PACRIM), Victoria, BC, Canada, 2015, pp. 240-245, doi: 10.1109/PACRIM.2015.7334841. (Year: 2015).*

\* cited by examiner

501 Convert patron related food item text documents to corresponding word vectors.

502 Convert restaurant related recipe and culinary preparation skill text documents to corresponding word vectors.

503 Compare the resultant Patron word vector with the Restaurant word vector using term vector space techniques.

504 Select the Restaurant word vector that is most similar to the Patron food-item requirement.

505 Modify restaurant recipe items based on restaurant ingredients, culinary capabilities to most closely align to patron's requirements.

506 Output Food Item Recipe to Patron and Restaurant devices.

Fig. 5

SYSTEM AND METHOD FOR IMAGE-BASED FOOD ITEM, SEARCH, DESIGN, AND CULINARY FULFILLMENT

CROSS-REFERENCE TO RELATED APPLICATIONS

Priority is claimed in the application data sheet to the following patents or patent applications, the entire written description of each of which is expressly incorporated herein by reference in its entirety:

62/984,237
Ser. No. 16/993,488
62/956,289
Ser. No. 17/005,012

BACKGROUND

Field of the Art

The disclosure relates to the field of computerized comparative and artificial intelligent systems, and more particularly to the field of computerized systems for food item personalization, optimization, business selection, food ordering, for retail business establishments and its patrons.

Discussion of the State of the Art

People frequently wishing to dine at a retail business establishment are limited to ordering and consuming a limited set of food items based on a restaurants long standing menu with limited manual customization that take into account a patron's dietary preferences or desired long-term outcomes. Similarly, restaurants are not free to dynamically change menu items based on ingredients on hand and/or culinary skills available that maximizes their business outcomes and impact on a particular patron and/or prospective patron dining experience. The result is often a suboptimal dining experience for restaurant consumers and reduced long term viability for the restaurant.

There is currently no automated system that personalizes and optimizes food item recipe generation and fulfilment to address these shortcomings.

What is needed is a system and method for automated and personalized image-based food item search, design, and culinary fulfilment to optimize the dining experience for both the patron and the dining establishment.

SUMMARY

Accordingly, the inventor has conceived, and reduced to practice, a system and method for image-based personalized food item search, design, and culinary fulfillment. The system is a cloud-based network comprising a food image engine, a prediction engine, a food item design engine, and portals for restaurants and patrons to enter their information. The system may receive as an input a food item image, perform image recognition on the food item image to identify a target food item, use the identified target food item to predict an ingredient list for the target food item, and generate personalized target food item recommendations for patrons based on a multitude of variables associated with the business enterprises, patrons historic culinary transactions, dietary needs and preferences both explicit and inferred. The system may be accessed through web browsers or purpose-built computer and mobile phone applications.

According to a preferred aspect, a system for image-based food item search, design and culinary fulfillment, comprising: a computing device comprising a memory, a processor, and a non-volatile data storage device; a recipe database stored on the non-volatile data storage device, the recipe database comprising a plurality of recipes, each recipe comprising a food type, a first list of required ingredients and a first required culinary skill; a patron profile database stored on the non-volatile data storage device, the patron profile database comprising a plurality of patron profiles, each patron profile comprising: a patron preference; and a patron review for one or more target food item recommendations, each target food item recommendation comprising a second list of required ingredients and a second required culinary skill; a first machine learning algorithm configured to identify associations among the patron preferences, the first lists of required ingredients, and the first required culinary skills; a food image engine comprising a first plurality of programming instructions stored in the memory which, when operating on the processor, causes the computing device to: obtain a food item image; process the food item image to extract image features; input the extracted image features into a second machine learning algorithm configured to recognize and output a target food item based on the image features; and send the output target food item to a prediction engine; and a prediction engine comprising a second plurality of programming instructions stored in the memory which, when operating on the processor, causes the computing device to: receive the target food item; identify and extract a set of features associated with the target food item; input the identified set of features associated with the target food item into a third machine learning algorithm configured to predict a match from the hypothesis space of the set of source ingredients to the received target food item; output a predicted ingredient list comprising a set of source ingredients and their proportions; and send the predicted ingredient list to a food item design engine; and a food item design engine comprising a third plurality of programming instructions stored in the memory which, when operating on the processor, causes the computing device to: convert the patron preferences, recipes, food items, and patron reviews to a first set of vector representations; pass the vector representations through the first machine learning algorithm to identify associations among the patron preferences, the first lists of required ingredients, and the first required culinary skills; receive a predicted ingredient list from the prediction engine; convert the predicted ingredient list to a second set of vector representations; pass the second set of vector representations through the machine learning algorithm to obtain a best fit between the ingredient list and the identified associations, the best fit comprising a third required list of ingredients and a third culinary skill; and generate a target food item recommendation from the best fit.

According to another preferred aspect, A method for image-based food item search, design and culinary fulfillment, comprising the steps of: storing a recipe database on a non-volatile data storage device of a computing device comprising a memory, a processor, and the non-volatile data storage device, the recipe database comprising a plurality of recipes, each recipe comprising a food type, a first list of required ingredients and a first required culinary skill; storing a patron profile database stored on the non-volatile data storage device, the patron profile database comprising a plurality of patron profiles, each patron profile comprising: a patron preference; and a patron review for one or more food item recommendations, each food item recommendation comprising a second list of required ingredients and a second required culinary skill; configuring a first machine learning algorithm to identify associations among the patron preferences, the first lists of required ingredients, and the first required culinary skills; using a food image engine operating on the computing device to: obtaining a food item image; processing the food item image to extract image features; inputting the extracted image features into a second machine learning algorithm configured to recognize and output a target food item based on the image features; sending the output target food item to a prediction engine; using a prediction engine operating on the computing device to: receiving the target food item; identifying and extract a set of features associated with the target food item; inputting the identified set of features associated with the target food item into a third machine learning algorithm configured to predict a match from the hypothesis space of the set of source ingredients to the received target food item; outputting a predicted ingredient list comprising a set of source ingredients and their proportions; sending the predicted ingredient list to a food item design engine; using a prediction engine operating on the computing device to: converting the patron preferences, recipes, food items, and patron reviews to a first set of vector representations; passing the vector representations through the first machine learning algorithm to identify associations among the patron preferences, the first lists of required ingredients, and the first required culinary skills; receiving a predicted ingredient list from the prediction engine; converting the predicted ingredient list to a second set of vector representations; passing the second set of vector representations through the machine learning algorithm to obtain a best fit between the ingredient list and the identified associations, the best fit comprising a third required list of ingredients and a third culinary skill; and generating a target food item recommendation from the best fit.

According to an aspect of an embodiment, the patron profile is updated with a patron review of the target food item recommendation received from the user.

According to an aspect of an embodiment, the patron preference is based on social media information retrieved from a social media network.

According to an aspect of an embodiment, the patron preference is based on nutritional data retrieved from a third-party resource over a network.

According to an aspect of an embodiment, the nutritional data comprises allergy information.

According to an aspect of an embodiment, the second machine learning algorithm is used to construct a food item model; and wherein the food item model is configured to recognize and output a target food item based on the image features.

According to an aspect of an embodiment, the third machine learning algorithm is used construct a prediction model; and wherein the prediction model is configured to predict a match from the hypothesis space of the set of source ingredients to the received target food item.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 5 is a flow diagram showing the steps of an exemplary method for an optimized food item recipe generation process based on a particular patron current food preferences, historical culinary transactions, current geographic location, and the restaurant's ingredients on hand and culinary skills.

DETAILED DESCRIPTION

Figure 1:
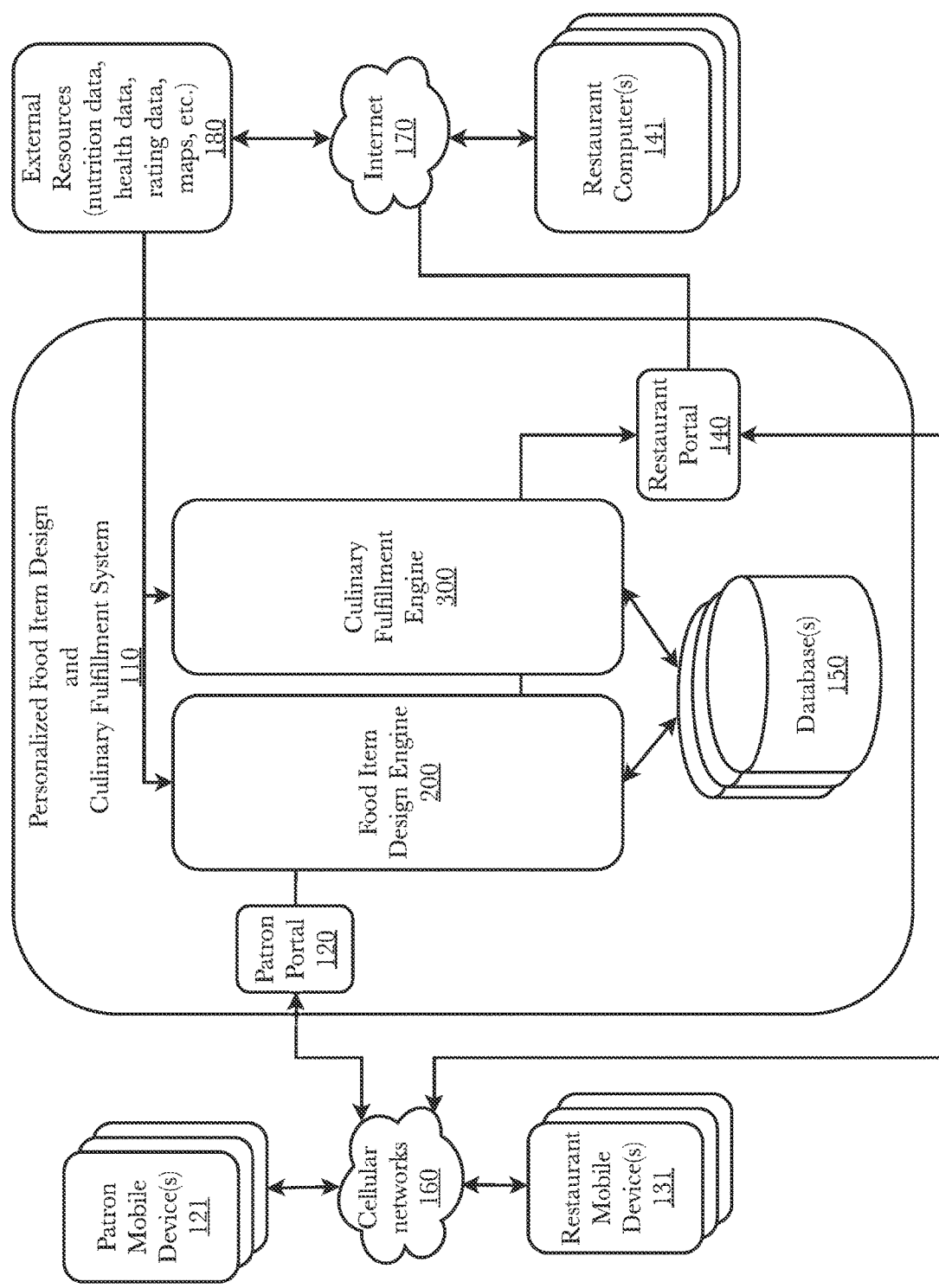
FIG. 1 is a block diagram illustrating an exemplary system architecture for an automated personalized food item design and culinary fulfillment system.

The inventor has conceived, and reduced to practice, a system and method for image-based personalized food item search, design, and culinary fulfillment. The system is a cloud-based network comprising a food image engine, a prediction engine, a food item design engine, and portals for restaurants and patrons to enter their information. The system may receive as an input a food item image, perform image recognition on the food item image to identify a target food item, use the identified target food item to predict an ingredient list for the target food item, and generate personalized target food item recommendations for patrons based on a multitude of variables associated with the business enterprises, patrons historic culinary transactions, dietary needs and preferences both explicit and inferred. The system may be accessed through web browsers or purpose-built computer and mobile phone applications.

It is common in today's age to interact with a business using online interactions almost exclusively. For example, due to widespread lockdowns in response the Covid-19 pandemic most restaurants have adopted online ordering, fulfillment, and food delivery using online resources. Furthermore, with contactless dining in place, the human to human element is further restricted. Food blogs and social media accounts dedicated to the food industry have proliferated in the past decade. As is especially the case with social media accounts, oftentimes a picture of a food item (e.g., a meal displayed on an Instagram account) may be posted online with little context such as, for example, the name of the dish, the location where the dish was eaten/purchased, and the ingredients required to make the meal. Therefore, if an individual wishes to eat to the meal they see in a picture they must expend energy to search for that missing context, which can be time and resources intensive. The disclosed system and method may be used to automatically process a food item image in order to generate a personalized recommendation of where to eat the food item in the image.

It is frequently the case that a person wishes to order food from a restaurant that meets a set of explicit requirements (e.g. healthy, fast, good price value, etc.) as well as an implicit requirement (reputable establishment, high quality ingredients, etc.). Additionally, the person has longer term nutritional goals (e.g. maintain healthy weight, blood pressure, energy level, etc.) that should be taken in consideration as they decide where and what to dine on. However, achieving the desired outcome using currently available tools is difficult and in doing so often results in a suboptimal experience for the patron and loss of viability for the business. The person could select a restaurant by chance, usually by seeing a sign for a restaurant while driving. Alternately, they could try to find a restaurant by searching using a mobile device. In this case, the person first has to open an application, search for nearby restaurants, and select a restaurant by clicking on it. However, in doing so, the decision is, again, based largely on chance, as the driver is forced to make a restaurant selection from restaurants shown in the nearby area and based only on the restaurant name, which may or may not indicate a type of cuisine (e.g., Italian food, American food, Mexican food, Japanese food, etc.). If the person wishes to get additional information, such as menu options, pricing, etc., the person is forced to take additional steps and time to researching restaurant websites, opening up menus, or calling the restaurant for more information. All of these methods are inefficient and none of them takes into account a myriad of factors that may affect the decision such as the person's current food preferences, historical culinary transactions, restaurants ingredients on hand and culinary skills available.

The invention is particularly useful to both restaurants and their patrons in personalizing and optimizing the dining experience. Personalized food item design enables restaurants to differentiate themselves by offering a unique menu that caters to their patron's needs while optimizing the food ingredients and culinary skills on hand. Patrons can select food items based on their current and past dietary requirements and preferences. As will be further disclosed herein, the invention makes a multivariate analysis of a large variety of factors (patron preferences; restaurant location, ingredient on-hand, culinary skill; social validation; etc.) to allow a patron to gain access to personalized food items fulfilled by convenient restaurant selection which optimize their dining experience and longer term dietary goals.

While the use case of patrons searching for food at a dining establishment is a primary example used herein, it is important to note that the invention is not so limited, and may be used by any person (e.g., person preparing food from home) seeking to purchase food items or ingredients at any retail business establishment (i.e., the invention is not limited to restaurants, and can be applied to any retail goods, such as grocery stores, on-line and/or brick and mortar; home food inventory).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a delivery-based business. Many examples herein use a restaurant as the business establishment, but the invention is not limited to use in restaurants, and is applicable to any business establishment. "Patron" is used to reference the customer or prospective customer of the business establishment.

Conceptual Architecture

FIG. 1 is a block diagram illustrating an exemplary system architecture 100 for a personalized food item design system and culinary fulfilment system, according to a preferred aspect. According to an aspect, and using a restaurant as an exemplary business establishment, system 100 comprises a food item design engine 200, a patron portal 120, a restaurant portal 140, databases 150, and a culinary fulfillment engine 300. Patron mobile devices 121 may connect to patron portal 120, typically via a cellular phone network 160, although connections may be made through other means, as well, such as through Internet 170 (e.g., through a Wi-Fi router). Restaurant computers 141 and/or restaurant mobile devices 131 may connect to restaurant portal 140, typically through an Internet 170 connection, although other network connections may be used.

According to an aspect, a patron may be enroute to a destination, such as her home. The patron may connect to patron portal 120 to pre-enter a variety of preferences and other information that may be stored in a database 150, and used by food item design engine 200 to suggest personalized food items that meet the patron's preferences. Examples of the types of preferences that a patron may enter include, but are not limited to: food preferences such as types of food (e.g. ethnicity such as Chinese, American, Greek, as well as for example style such as spicy or soup and salad or steakhouse fare, etc.), frequency with which preferred foods are eaten, ranking of particular foods relative to other foods, patrons inconvenience preferences such as time delays and distance/time required of detour, food attributes such as price, calories, ingredients, and side dishes. In some aspects, certain of these preferences may be determined by system 100. For example, the types of food preferred by the patron and the frequency with which preferred foods are eaten may be determined based on the culinary transaction history of usage or stored in a database 150 in the system. Other such preferences and factors may also be determined by system through access to one or more external resources 180 such as a health service provider that may include known food allergies, blood pressure history, diabetic information and so forth. Other exemplary external resources may comprise research organizations such as National Library of Medicine, government data sources such as data.gov, corporate sources such as Registry of Open Data (RODA) on Amazon Web Services Likewise, restaurants may connect to restaurant portal 140 to enter information about the restaurant and its menu. Examples of the types of information that a restaurant may enter include, but are not limited to: restaurant name, location, types of food offered, hours of operation, phone number, specific menu offerings, food preparation times for certain dishes (including adjustments to food preparation times during busy periods for the restaurant), prices, calorie counts, ingredients, side dishes, drinks, and special pricing options like daily "happy hour" specials or seasonal offerings. In some aspects, the system may be able to determine certain restaurant information by accessing external resources 180 such as mapping websites and applications. For example, system may access a publicly-available mapping website such as Google maps, which may contain information about the restaurant's name, location, types of food offered, hours of operation, phone number, etc. Thus, in some aspects, it is not necessary for the restaurant to enter certain information through portal, as the information may be automatically obtained from external resources 180.

When a patron mobile device 121 connects to personalized food item design and culinary fulfilment system 110 and the patron requests en-route food item assistance, food item design engine 200 retrieves the patron preferences from a database 150. The patron may further enter additional food item preferences and a destination or select a pre-entered destination presented from the patron's preferences through patron real-time update engine 211, which will allow the system to better customize its restaurant suggestions. A culinary fulfilment engine 300 then determines the patron's location by querying the patron's mobile device for location information (e.g., provided by the mobile device's GPS hardware, Wi-Fi location applications, etc.) and gathers information from external resources 180 about restaurant options located nearby and along the route from the patron's currently location to the patron's destination, as well as traffic information related to the patron's location, intended route, and identified restaurant options. A culinary fulfilment engine 300 retrieves additional information from a database about identified restaurant options, if such information is available. Based on the patron preferences, restaurant information, and traffic information, culinary fulfilment engine 300 identifies one or more restaurants and one or more food options available at those restaurants that are compatible with the patron's preferences, and presents the identified restaurants and their corresponding food options to the patron on the patron's mobile device 121 as suggestions along with indications of the additional delay that will be caused by choosing each suggestion.

In some aspects, an application on patron's mobile device 121 may dial the phone number of the chosen restaurant for the patron to place the order via voice and combination of text message. In an aspect, culinary fulfilment server 300 will contact the restaurant through restaurant portal 140 to automatically enter an order into the restaurant's computer 141, or to direct an employee of the restaurant to call the patron's mobile device 121, or to establish a voice connection between the restaurant and the patron's mobile device 121 through another means (e.g., voice over internet protocol, or VOIP).

In some aspects, culinary fulfilment engine 300, through restaurant portal 140, may also provide information to the restaurant to schedule the restaurant's food preparation activities to coordinate with the patron's arrival. If the restaurant has entered information such as food preparation times, culinary fulfilment engine 300 may use that information to instruct the restaurant's kitchen staff when to start preparation of the patron's order, such that the order will be ready just prior to arrival of the patron. Such food preparation times and scheduling may be adjusted for busy periods at the restaurant (typically around lunch and dinner) either automatically based on the restaurant's history as stored in a database 150, or by retrieving information stored in a database 150 that has been manually entered by the restaurant through restaurant portal 140.

Figure 2:
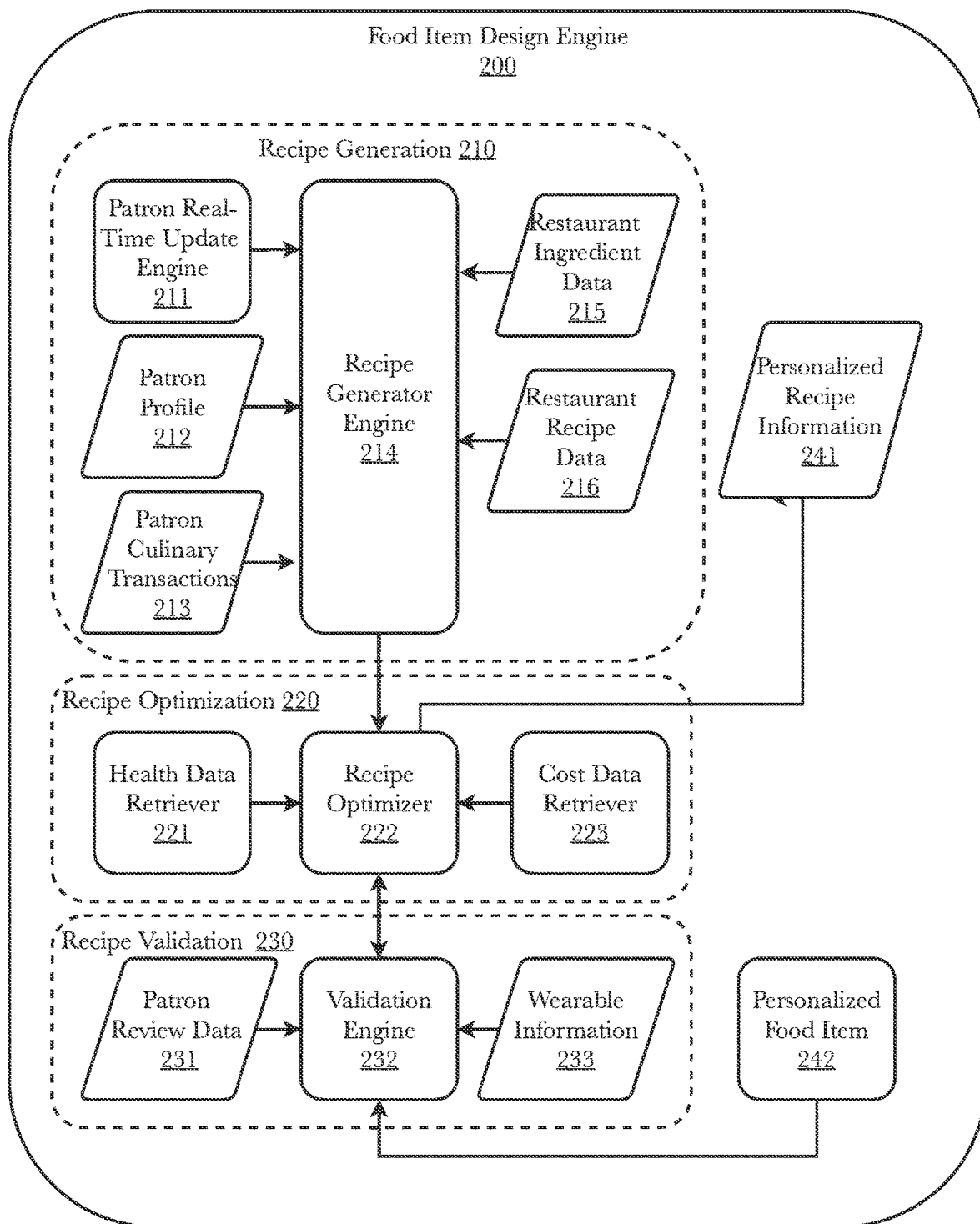
FIG. 2 is a block diagram illustrating an exemplary architecture for an aspect of an automated food item design engine.

FIG. 2 is a block diagram illustrating an exemplary architecture for an aspect of an automated food item design engine 200. According to an aspect, a food item design engine 200 comprises several subsystems, a recipe generation subsystem 210, a recipe optimization subsystem 220, and aa recipe validation subsystem 230. A recipe generation subsystem comprises a patron real-time update engine 211, a patron profile 212, patron culinary transaction 213, recipe generator engine 214, restaurant ingredient data 215, and restaurant recipe data 216. A patron real-time update engine 211 enables the patron to provide up-to-date food item input by the patron using an application on his or her mobile device 131. A patron profile 212, patron culinary transactions 213, restaurant ingredient data 215, and restaurant recipe data 216 may be retrieved from a database 150 or, in some aspects, obtained from external resources 180.

A recipe optimization subsystem comprises a recipe optimizer 222, a health data retriever 221, and a cost data retriever 223. A health data retriever 221 obtains health data from external sources 180, that may include a health provider system, while a cost data retriever 223 may either obtain cost data from a database 150 or from external resources 180.

A recipe validation subsystem 230 comprises patron review data 231, a validation engine 232, and wearable data 233. A validation engine may take as input patron review data, wearable data and personal food item information; and provides as output updates to a food item recipe to a recipe optimizer 222.

In operation, when a patron is desiring food item assistance a recipe generator engine 214 receives the patron's current food item requirements from a patron real time update engine 211 along with a patron profile 213. A recipe generation engine 214 obtains restaurant ingredient data 215 and restaurant recipe data 216 for one or more restaurants either from a database 150 or from external resources 180. A recipe generation engine 214 then uses machine learning algorithms to create a personalized food item optimized to meet the patron preferences and outcomes.

A recipe generator engine 214 presents recommendations to the patron about food items meeting the patron's preferences and allows the patron to select an option on his or her mobile device 121 by simply selecting an option (on a touch-based mobile device interface, for example).

A recipe generator engine 214 then sends the information about the selected recipe to a recipe optimizer 222, which obtains health data from health data retriever 221 and cost from cost data retriever 223 and optimizes the recipe. Optimization may occur around one or more parameters including health, cost, restaurant dining experience, etc. depending on patrons near and long-range goals and stated outcomes. Once complete, recipe optimizer engine 222 sends personalized recipe information 241 to a culinary fulfillment engine 300.

In some aspects, food item design 200 engine may have a recipe validation subsystem 230, in which a validation engine 232 receives feedback from the patron's experience from patron review data 231 and patrons wearable information 233 and associates with a personalized food item 242. The feedback in the form of subjective text comments and/or objective measurements (e.g. blood pressure, glucose levels) may then be updated in the patron's culinary transactions 213 for use in future food item optimization.

Note that this example is simplified for clarity, and that food item design engine 200 will address a much broader set of factors and variables, as described elsewhere herein. The food item design engine may use any number of optimization algorithms, including machine learning algorithms or others known in the art, to find optimal solutions to the large number of variables presented.

Figure 3:
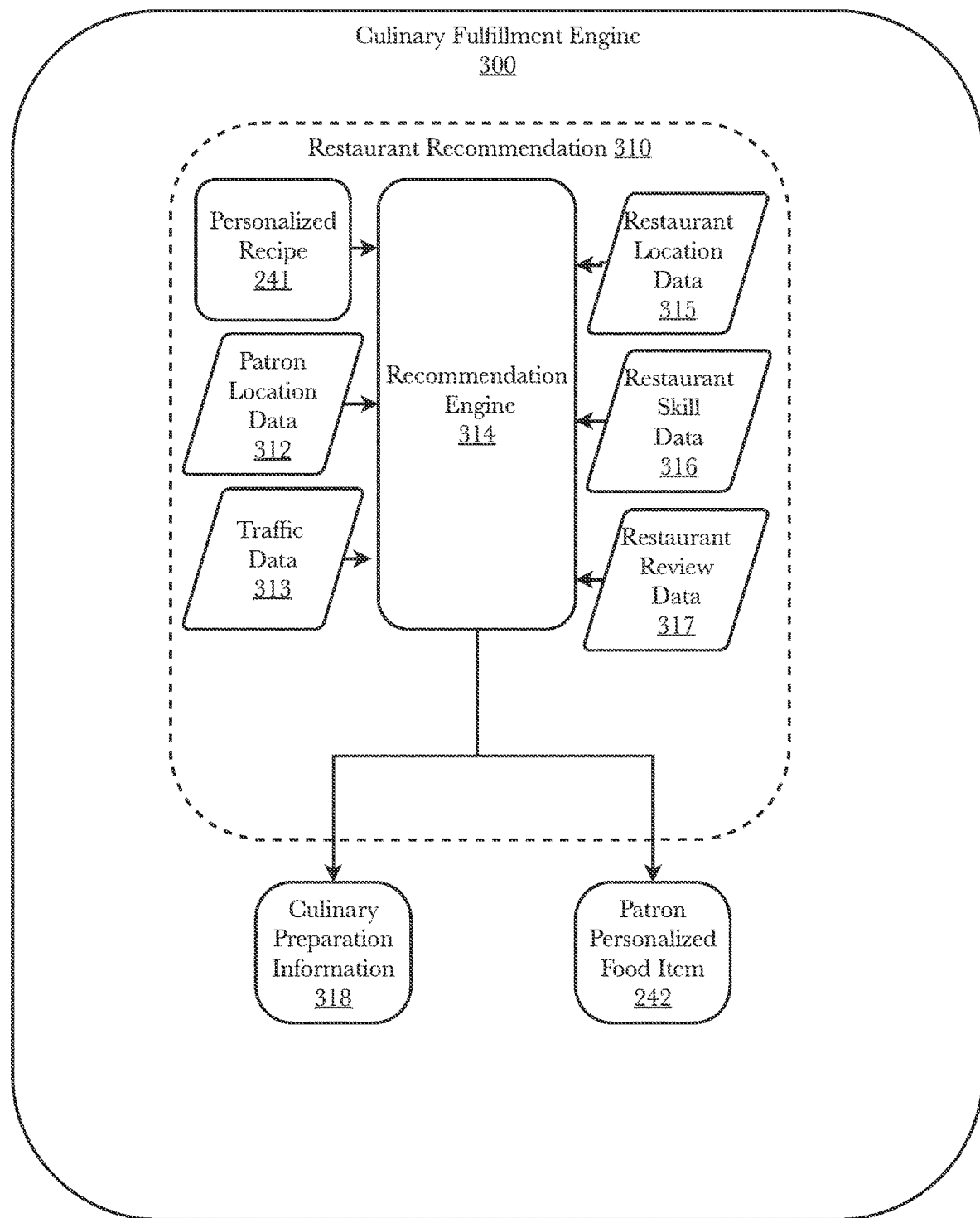
FIG. 3 is a block diagram illustrating an exemplary architecture for an aspect of an automated culinary fulfillment engine.

FIG. 3 is a block diagram illustrating an exemplary architecture for an aspect of an automated culinary fulfilment engine. According to an aspect, culinary fulfilment engine 300 comprises, a restaurant recommendation system 310, comprising a personalized recipe information 241, patron location data 312, traffic data 313, a recommendation engine 314, restaurant location data 315, restaurant skill data 316, restaurant review data 317, culinary preparation information 318, and patron personalized food item 242.

In operation, recommendation engine 314 will take as inputs a personalized recipe information 241, patron location data 312, traffic data 313, restaurant location data 315, restaurant skill data 316, restaurant review data 317. Using semantic vector space methods familiar to those skilled in the art, the input data is represented as word vector and compared using cosine similarity techniques with the optimized target vector to provide as outputs a culinary preparation information 318 that is used by the restaurant and a patron personalized food item 242 that is displayed to the patron.

Figure 14:
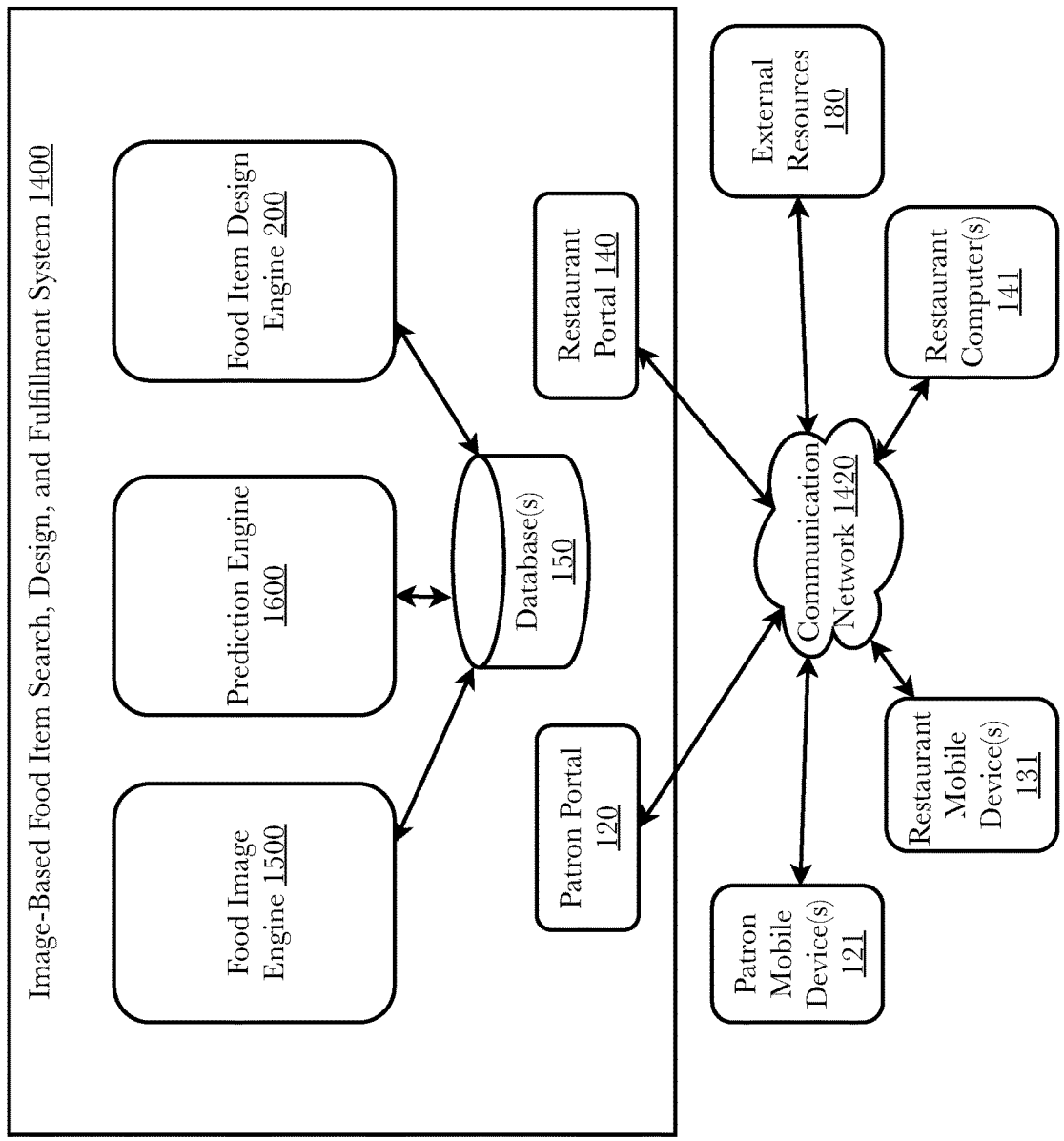
FIG. 14 is a block diagram illustrating an exemplary architecture for an image-based food search, design, and fulfillment ("IFSDF") system, according to an embodiment.

FIG. 14 is a block diagram illustrating an exemplary architecture for an image-based food search, design, and fulfillment ("IFSDF") system, according to an embodiment. In this embodiment, the IFSDF system 1400 may be configured to: receive a photograph and/or image of a food item (e.g., a user submitted food item image via patron portal 120); extract any food item features of food item image; input the extracted food item features into a trained and machine learned model to recognize the target food item(s) associated with the food item image; use the target food item and features of ingredients stored in a database(s) 150 as inputs to a trained prediction model to determine an ingredient set comprising the most relevant ingredients and their proportions; and use the determined ingredient set, patron preferences, and the required culinary skills necessary to prepare the target food item as inputs into a machine learning algorithm configured to identify associations between the inputs in order to generate a best fit between the food item image and identified associations.

According to some embodiments, IFSDF system 1400 may comprise one or more engines and/or modules configured to perform various computational tasks, actions, or outcomes. A food image engine 1500 may be configured to receive, retrieve, or otherwise obtain a food item image, process and extract features associated with the food item image, train one or more machine learning algorithms to create a food item model, and then deploy the one or more food item models to recognize the food item(s) contained within the food item image. A prediction engine 1600 may be configured to train one or more machine learning algorithms in order to create a prediction model using features of ingredients stored in database(s) 150 to match those of the given target food. Once trained, this prediction model may take as an input a target food item (e.g., such as a user submitted food item request/query via patron portal 120, or a recognized food item as output by the food item model of the food image engine 1500) and predict an ingredient list for the target food item comprising the most relevant ingredients and their proportions. The predicted ingredient list may be used by food item design engine 200 to suggest personalized target food items that meet the patron's preferences. Food item design engine 200 may operate one or more machine learning algorithms configured to identify associations among patron preferences and lists of ingredients and required culinary skills as stored in a restaurant database(s) 150. According to some embodiments, food item design engine 200 may receive the predicted ingredient list from prediction engine 1600 corresponding to the target food item as recognized by food image engine 1500, and convert the ingredient list to set of vector representations. These vector representations may be passed through a machine learning algorithm to obtain a best fit between the ingredient list and the identified associations. In some embodiments, the best fit may comprise a required list of ingredients and a culinary skill needed to execute the required list of ingredients into a food item/meal. Food item design engine 200 may then generate a target food item recommendation from the best fit. For example, using the best fit, a restaurant which has the required ingredients on hand and a chef(s) with the necessary culinary skills to prepare the target food item in accordance with the patron preferences may be selected using a restaurant database and recommended to the patron. The patron may receive the recommendation at patron mobile device 121 and can choose to accept or reject the recommendation. In this way, IFSDF system 1400 may process a user submitted food item image and recommend a restaurant that can prepare the target food item personalized to the user preferences.

Additionally, IFSDF system 1400 may comprise one or more portal(s) configured to allow for bidirectional data exchange and communication between different devices and individuals with IFSDF system 1400. A patron may connect to patron portal 120 to pre-enter a variety of preferences and other information that may be stored in a database 150, and used by food item design engine 200 to suggest personalized food items that meet the patron's preferences. Examples of the types of preferences that a patron may enter include, but are not limited to: food preferences such as types of food (e.g. ethnicity such as Chinese, American, Greek, as well as for example style such as spicy or soup and salad or steakhouse fare, etc.), frequency with which preferred foods are eaten, ranking of particular foods relative to other foods, patrons inconvenience preferences such as time delays and distance/time required of detour, food attributes such as price, calories, ingredients, and side dishes. In some aspects, certain of these preferences may be determined by IFSDF system 1400. For example, the types of food preferred by the patron and the frequency with which preferred foods are eaten may be determined based on the culinary transaction history of usage or stored in a database 150 in the system. Other such preferences and factors may also be determined by system through access to one or more external resources 180 such as a health service provider that may include known food allergies, blood pressure history, diabetic information and so forth. Other exemplary external resources may comprise research organizations such as National Library of Medicine, government data sources such as data.gov, corporate sources such as Registry of Open Data (RODA) on Amazon Web Services, nutrition data, health data, rating data, maps and/or location data, traffic data, supply chain data, etc.

Likewise, restaurants may connect to restaurant portal 140 to enter information about the restaurant and its menu. Examples of the types of information that a restaurant may enter include, but are not limited to: restaurant name, location, types of food offered, hours of operation, phone number, specific menu offerings, food preparation times for certain dishes (including adjustments to food preparation times during busy periods for the restaurant), prices, calorie counts, ingredients, food item features, side dishes, drinks, and special pricing options like daily "happy hour" specials or seasonal offerings. In some aspects, the IFSDF system 1400 may be able to determine certain restaurant information by accessing external resources 180 such as mapping websites and applications. For example, system may access a publicly-available mapping website such as Google maps, which may contain information about the restaurant's name, location, types of food offered, hours of operation, phone number, etc. Thus, in some aspects, it is not necessary for the restaurant to enter certain information through portal, as the information may be automatically obtained from external resources 180.

According to some embodiments, IFSDF system 1400 may be configured to connect to one or more communication networks 1420 for bidirectional data exchange and communication between and among different devices and individuals. Communication network 1420 may be any suitable communication network known to those skilled in the art such as mobile device networks (e.g., mobile phone carrier networks) or the internet. Communication network 1420 and IFSDF system 1400 may be connected in any suitable configuration known to those skilled in the art such as, for example, wired or wireless network connections, or some combination of the two. Patron mobile devices 121 may connect to patron portal 120, typically via a cellular phone network, although connections may be made through other means, as well, such as through Internet (e.g., through a Wi-Fi router). Restaurant computers 141 and/or restaurant mobile devices 131 may connect to restaurant portal 140, typically through an Internet connection, although other network connections may be used.

In an exemplary use case, an IFSDF system 1400 user (e.g., potential restaurant patron) may be browsing food blogs on the Internet or may be viewing food items on social media, and the user happen upon the image of a food item that they would like to eat. The user may submit/upload (e.g., copy/paste image, submit screenshot, etc.) the food item image using a software application operating on their mobile device 121 and connecting through the patron portal 120. The food image engine 1500 can receive the food item image and determine what the target food item (i.e., the food item in the image) is. Because the food image engine 1500 can determine what the target food item is in the submitted food item image, it allows system users/patrons to submit an image for a food item that they do not necessarily know the name of, but that they would still like to try. This reduces the burden on the user/patron to know the name, or have to spend extra time researching the name of the dish associated with a food item image. This is useful because oftentimes on the internet pictures can exist without context (e.g., description, title, place/time of origin, etc.), and the food item engine 1500 can help alleviate the burden on the user to seek out context that may or may not be available. Then, prediction engine 1600 can predict an ingredient list for the determined target food item based on the restaurant data (e.g., menu, ingredients, preparation techniques, culinary skills, etc.) contained in database(s) 150. This list may passed to food item design engine 200 which may generate suggested personalized target food items that meet the patron's preferences and that can be prepared by a restaurant local to the user/patron.

Figure 15:
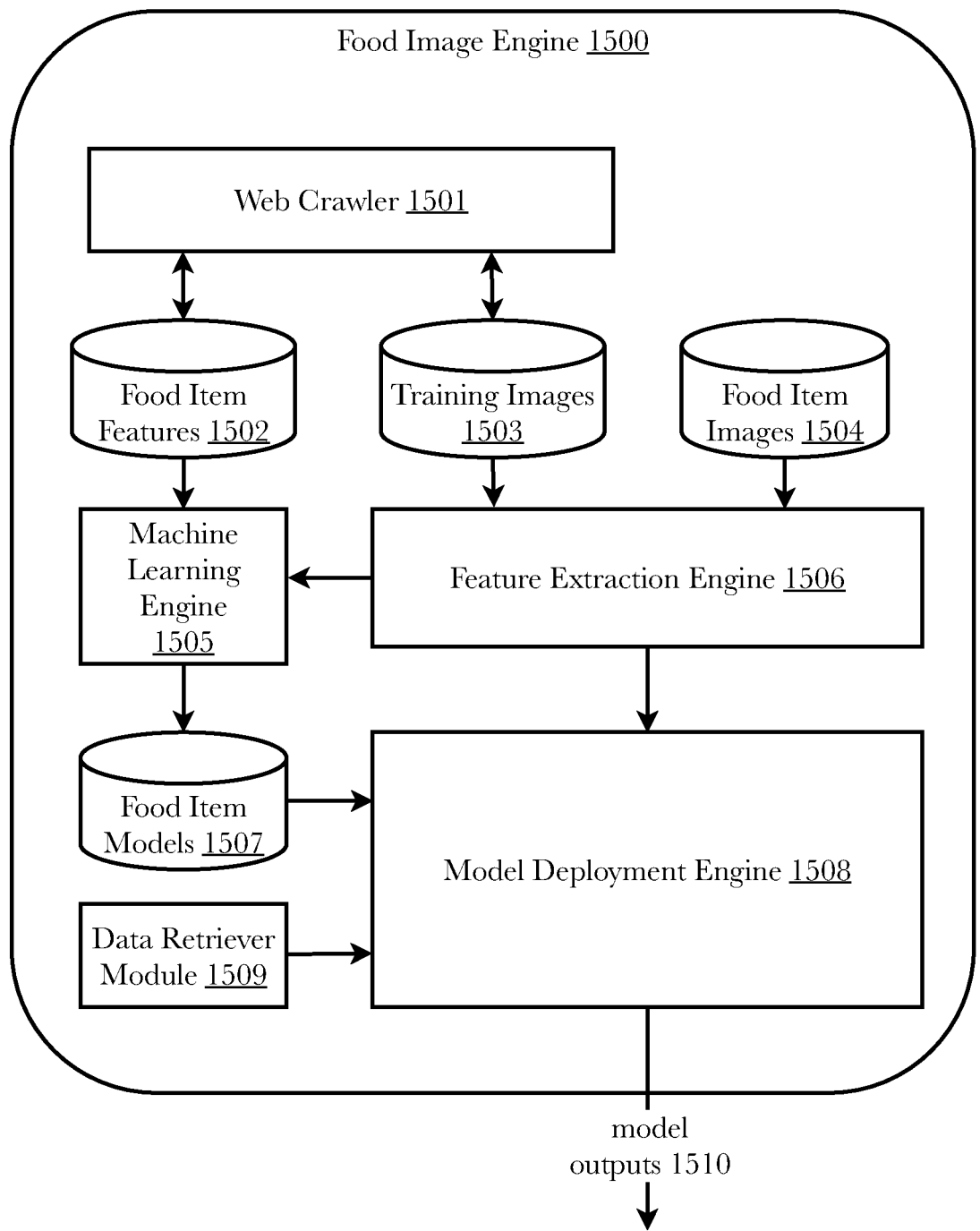
FIG. 15 is a block diagram illustrating an exemplary aspect of the IFSDF system, the food image engine.

FIG. 15 is a block diagram illustrating an exemplary aspect of the IFSDF system, the food image engine 1500. According to some embodiments, food image engine 1500 may comprise a plurality of web crawlers 1501, a machine learning engine 1505, a feature extraction engine 1506, a model deployment engine 1508, and a data retriever module 1509. Additionally, food image engine 1500 may further comprise one or more databases configured to store a variety of information such as the non-limiting examples of food item features 1502, training images 1503, food item images 1504, and food item models 1507.

In general, food image engine 1500 provides various approaches for using trained food item models 1507 to recognize food from food item images, and in some embodiments, to estimate nutritional information associated with the recognized food. While the food item models 1507 described herein may be trained using a wide range of data sources, in various embodiments, one or more of the food item models 1507 created by food image engine 1500 focus on the restaurant (e.g., dine-in, take-out, etc.) scenario based on the observation that restaurant meals are typically visually and nutritionally similar across many servings and potentially many photographs/images. This may allow food image engine 1500 to use image recognition to label food and estimate nutritional information given an existing set of known food items (e.g., using restaurant menu information stored in database(s) 150).

According to some embodiments, the information used to estimate the nutritional information for food items is referred to as features or labels. For example, food name, restaurant location or food source, ingredients, preparation technique, item size, calories, vitamins, iron, etc., are all non-limiting examples of features and/or labels. The combination of these features and corresponding images may be provided as labeled examples to train one or more food item models 1507. Once the food item models have been trained, they may be deployed and the food image engine 1500 can be used to identify the target food item in the food item image using one or more food item models. In some embodiments, that recognition may then be used to estimate the associated nutritional information of the target food item from the food item model.

Instead of trying to segment food item images into constituent food items (e.g., this part of image is mashed potatoes, and this part is pork chops), food image engine 1500 instead recognizes the food item as a whole, thereby reducing problems of food item segmentation and food items being occluded in the food item image. However, it should be noted that food image engine 1500 is configurable of separately recognizing multiple individual food items in a single food item image by simply training one or more of the food item models on individual food items.

Food item engine 1500 may operate by providing a plurality of training images 1503 to a feature extraction engine 1506. Feature extraction engine 1506 may process each training image 1503 to extract a plurality of image features for use in training one or more food item models 1507. Examples of features that may be extracted include, but are not limited to, color, histogram of oriented gradients, scale-invariant feature transforms, local binary patterns, texton histograms, etc. During runtime when food item models 1507 are deployed, feature extraction engine 1506 may process a received food item image to extract a plurality of features for recognition purposes. Web crawler 1501 may be used in order to obtain meal images for use in training food item models 1507. For example, web crawler 1501 may be optionally used to search available sources to obtain training images corresponding to food items or menus for particular sources when corresponding training images are not readily available. Images obtained via web crawler 1501 can be provided as training images 1503 and processed in the same manner described above to extract image features for use in training food item models 1503.

Extracted training image 1503 features may then be sent to the machine learning engine 1505. Generally, the machine learning engine 1505 can use any variety of machine learning techniques to learn or train one or more food item models 1507 using combinations of image features provided by feature extraction engine 1506 and corresponding food item features 1502. According to some embodiments, each of the training images 1503 is associated with one or more meal features 1502. For example, meal features may include, but are not limited to, food type, meal contents, portion size, nutritional content, preparation techniques, ingredient substitutions, food source, ingredients, etc. Restaurants may provide information related food item features 1502 or food item images 1504 manually via restaurant portal 140 and stored in database 150. Food image engine 1500 may retrieve information stored in database 150 in both the food item model training stage and the food item model deployment stage.

Once one or more food item models have been trained or learned by the machine learning engine 1505, these models may then be available (e.g., locally or via remote service, etc.) for use by the model deployment engine 1508. Generally, model deployment engine 1508 uses one or more food item models 1507 to evaluate image features extracted from a user submitted food item image 1504 to recognize one or more matching meals or food items (i.e., target food item). The model deployment engine 1508 may then output the corresponding target food item 1510 which may be stored for future use. In addition to storing the target food item, the target food item may be sent back to the patron mobile device 121 via the patron portal 120 and communication network 140 where it may be displayed to the user who submitted the food item image 1504. At this point the user may confirm or reject that the displayed target food item is indeed the food item they were searching for. In the case that the displayed target food item is not what the user intended to search for, food item engine 1500 can apply this feedback as an input into the model as a new label and run the food item models(s) again via the model deployment engine 1508 to generate a new target food item. In the other case whereby a user confirms the that the target food item is the intended food item, then the target food item may be sent to a prediction engine 1600 for further processing. In some embodiments, IFSDF system 1400 does not require user confirmation of recognized target food item prior to passing the model outputs 1510 to prediction engine 1600.

According to some embodiments, model deployment engine 1508 may be constrained using user-specific parameters selected from a plurality of user inputted preferences, or other constraints such as location and time. The data retriever module 1509 may retrieve the data used to constrain the food item model(s). For example, data retriever module 1509 may retrieve a user/patron profile from database 150 in order to determine user-specific parameters (e.g., food type preferences, allergens, health restrictions, etc.) which can be used to provide to tailor image recognition to the individual user. Data retriever module 1509 may also be used to retrieve data from external resources and/or third party sources such as location information (e.g., home, restaurant, school, in transit, etc.) associated with the user and/or food item image. In some embodiments, data retriever module 1509 may use various automated tracking or localization techniques (e.g., GPS, cell-tower based localization, RFID, etc.), or manual user selection or input, to determine the location where a food item image 1504 was captured.

Sample food item images collected for use as training images 1503 may be gathered either as a top-down approach (e.g., by collecting food item image data for restaurants in major cities), or as a bottom-up approach (e.g., populated by leveraging prevalent social media use in restaurants, e.g., Yelp, Twitter, Foursquare, Meal Snap, Instagram, direct contributions from participating restaurants, etc.). In either case, the collected training images 1503 are then combined with any available food item information to construct labeled examples that can be provided as input to train each food item model 1507. Over time, as actual food item images from participating restaurants are provided for use in recognizing a target food item, those food item images can be used to update the corresponding food item models. When this is used in conjunction with tracking or localization data it allows food image engine 1500 to improve recognition accuracy for food items as a whole and, particularly, at a specific restaurant location over time.

According to some embodiments, machine learning engine 1505 may be configured to use any desirable machine learning techniques to learn or train food item models 1507 using the labeled examples. Examples of machine learning techniques that can be used include, but are not limited to, supervised learning based techniques (e.g., artificial neural networks, Bayesian-based techniques, decision trees, etc.), unsupervised learning based techniques (e.g., data clustering, expectation-maximization algorithms, etc.) reinforcement learning based techniques, deep learning based techniques, and the like. As a more specific example of a type of machine learning technique that may be used by machine learning engine 1505, consider the image recognition framework based on a "bag of visual words" machine learning approach. This approach begins by extracting a plurality of types of base features from food item images (for each class of category). These base features may include characteristics such as color, histogram of oriented gradients, scale-invariant feature transforms, local binary patterns, texton histograms, and various others, although more or fewer features may also be used. These extracted base features may then be encoded with a locality-constrained linear encoding, using a dictionary learned via k-means clustering.

Figure 16:
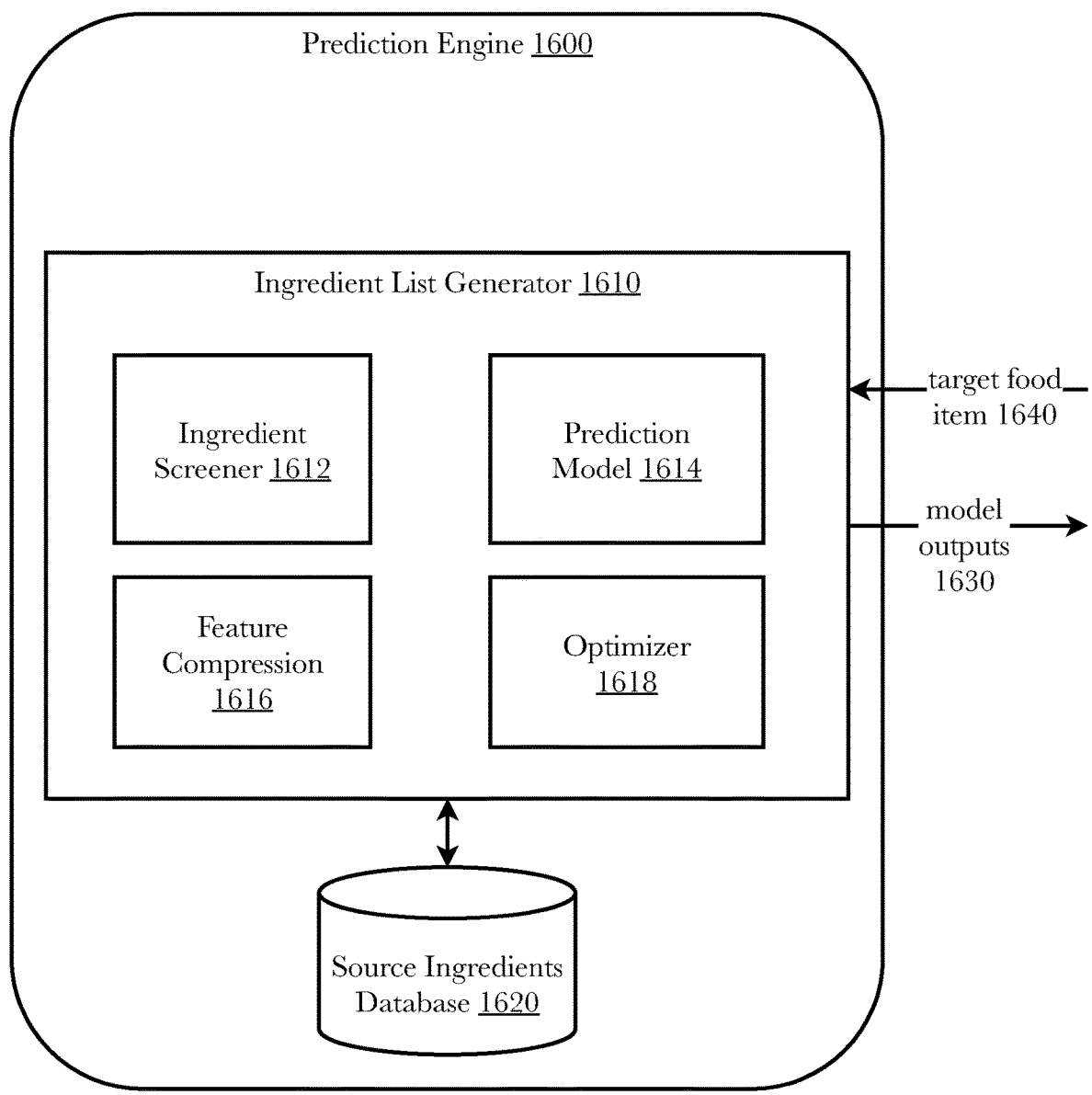
FIG. 16 is a block diagram illustrating an exemplary aspect of the IFSDF system, the prediction engine.

FIG. 16 is a block diagram illustrating an exemplary aspect of the IFSDF system, the prediction engine 1600. According to some embodiments, prediction engine 1600 may comprise a source ingredients database 1620, and an ingredient list generator 1610. According to some aspects, ingredient list generator 1610 may comprise an ingredient screener 1612, one or more prediction models 1614, a feature compression module 1616, and an optimizer 1618.

According to various embodiments, prediction engine 1600 may be configured to utilize one or more machine learning algorithms to construct one or more prediction models 1614 to generate, as outputs 1630, an ingredient list using source ingredients to create a given target item in terms of flavor, color, feel, and/or functionality while also taking into account patron preferences. The output ingredient list 1630 may be sent to food item design engine 200 where it may be used as an input to a machine learning algorithm to generate personalized food recommendations. The food item source ingredients 1620 can include, but are not limited to, plant-based ingredients (e.g., vegetables, fruits, herbs, nuts, oils, legumes, starch proteins, etc.), animal-based ingredients (e.g., dairy products, egg-based products, meat, seafood, etc.), water-based ingredients, synthetic ingredients (e.g., artificial meats, artificial sweeteners, artificial milk, etc.), or a combination thereof. Source ingredients 1620 may be stored in database 150 and retrieved by IFSDF system 1400 components, such as prediction engine 1600. Source ingredients associated with a particular restaurant may be collected and stored in database 150 by either automatically using external resources 180 and third party applications (e.g., integration with supply chain management software, etc.), or manually by restaurant staff (e.g., owner, manager, chef, etc.) using a restaurant computer 141 or restaurant mobile device 131 via restaurant portal 140. In some embodiments, food item source ingredients 1620 may refer to a list of all available food item ingredients at a particular restaurant, and for each food item ingredient a quantity of that food item. In some embodiments, for each food item ingredient in the source ingredient database 1620 there is also stored an expiration date associated with the ingredient.

According to some embodiments, source ingredient database 1620 may be configured to store an associated set of features for each source ingredient in a plurality of source ingredients. These set of features are distinct and separate from the extracted features as described in detail above, referring to FIG. 15. The associated set of features for each source ingredients may include physiochemical, biochemical, nutritional, and/or molecular features.

According to some embodiments, ingredient list generator 1610 may be configured to generate an ingredient list as a model output 1630 for a given received target food item 1640 based on source ingredients from source ingredients database 1620. The ingredient list may identify one or more source ingredients and/or their proportions. In some embodiments, one or more prediction models 1614 may be trained to match from the hypothesis space of the set of source ingredients (used as data features) to the given target food item using a feature selection process. The prediction model may be based on a gradient boosting tree for regression. The gradient boosting tree may be trained to fit a particular target by using the available features. Each new target food item can be a new regression problem. An ingredient list may be determined by presenting a feature selection problem to the trained prediction model where the features can be the source ingredients. The feature selection process may include selecting the most relevant features using the prediction model as a potential set of source ingredients to be included in the ingredient list. The ingredient list generator 1610 may be further configured to execute an optimization 1618 process to find specific proportions for the selected source ingredients to generate the ingredient list. In some embodiments, Lasso optimization may be performed to balance the proportions of different ingredients in the list of source ingredients. In some arrangements, ingredient list generator may be configured to generate an ingredient list without the determination of the proportions for each ingredient on the list.

According to some embodiments, feature compression module 1616 may be used to perform feature compression. According to some embodiments, the one or more prediction models 1614 may implement a feature compression technique known to those skilled in the art. For example, feature compression techniques such as kernel component analysis (KPCA) or auto-encoding. It should be noted, however, that the prediction models may also be trained with no feature compression. Compression techniques such as those described above may provide techniques for non-linear feature extraction to reduce the dimensionality of the features dataset.

According to some embodiments, the one or more prediction models 1614 may utilize one or more machine learning algorithms including any one or more of: supervised learning (e.g., gradient boosting trees, logistic regression, back propagation neural networks, random forest, decision trees, etc.), unsupervised learning (e.g., Apriori algorithm, K-means clustering, etc.), semi-supervised learning, deep learning algorithm (e.g., neural networks, restricted Boltzmann machine, a deep belief network, convolutional neural network, recurrent neural network, stack auto-encoder, etc.), reinforcement learning (e.g., Q-learning algorithm, temporal difference learning), a regression algorithm (e.g., ordinary least squares, logistic regression, stepwise regression, multivariate adaptive regression splines, locally estimated scatterplot smoothing, etc.), an instance-based method, (e.g., k-nearest neighbor, learning vector quantization, self-organizing map, etc.) a regularization method (e.g., classification and regression tree, iterative dichotomizer 3, C4.5, chi-squared automatic interaction detection, decision stump, random forest, etc.), a Bayesian method, a kernel method, (e.g., support vector machine, a radial basis function, etc.), a clustering method, an artificial neural network (e.g., Perceptron method, back-propagation, etc.), and many other methods known to those skilled in the art.

According to some embodiments, ingredient screener 1612 may be configured to create a screening of the target food item and/or source ingredients. The screening may process each food item into a representation in a D-dimensional space that contain food features related nutritional, sensorial, and physiochemical descriptors. For example, each food item may be represented in vector space of multiple features associated with the descriptors. As each source ingredient in database 1620 is also associated with a set of features, the prediction model 1614 may be presented with a feature selection problem where the features can be source ingredients, and the most relevant features selected may be the ingredient list.

Detailed Description of Exemplary Aspects

Figure 4:
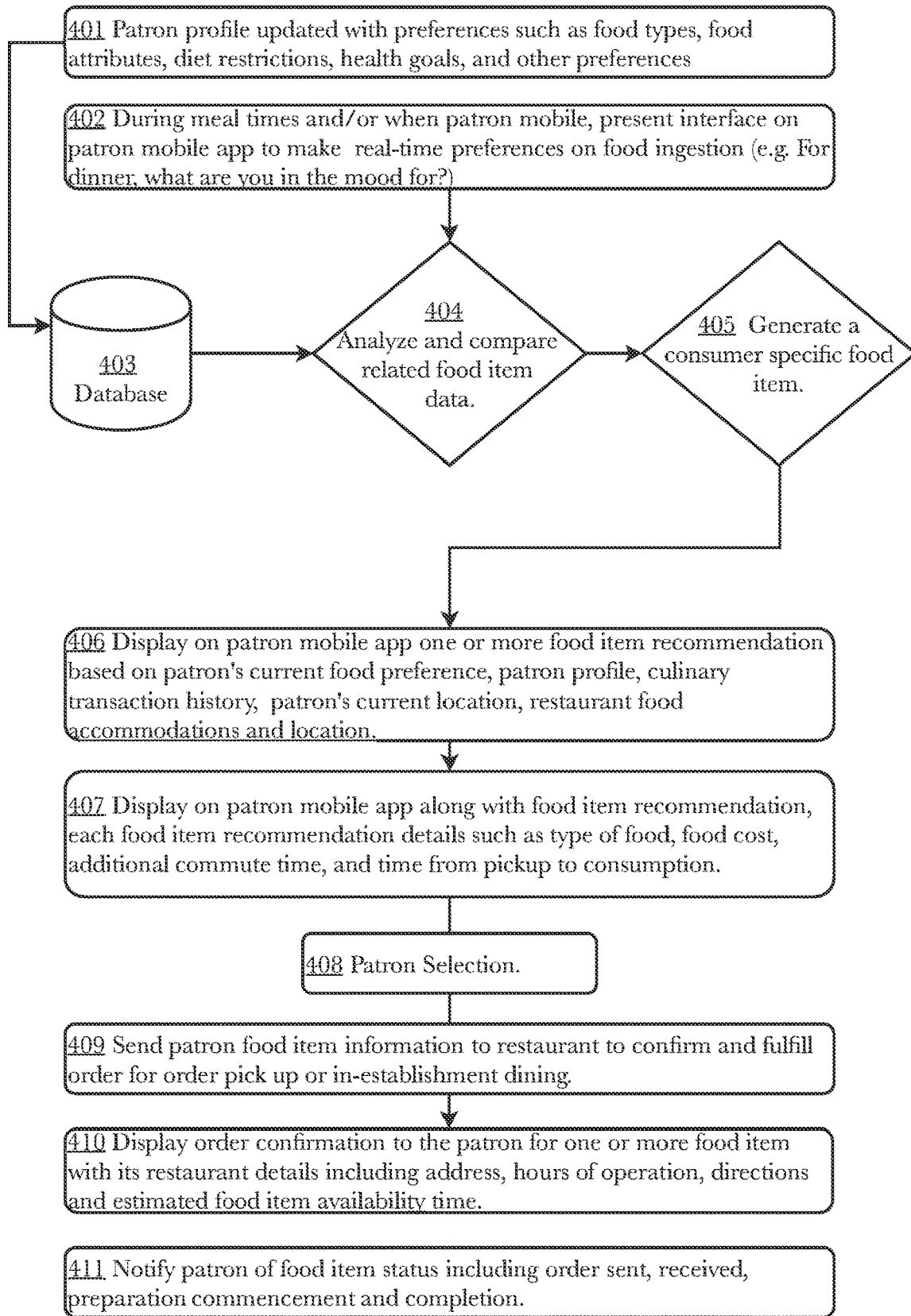
FIG. 4 is a flow diagram showing the steps of an exemplary method for personalized food item design, selection, restaurant selection, order fulfilment and receipt by a restaurant patron.

FIG. 4 is a flow diagram showing the steps of an exemplary method for personalized food item design, selection, restaurant selection, order fulfilment by selected restaurant. A patron portal is provided for the patron to pre-enter preferences such as food types, food attributes, diet restrictions, health goals, and other preferences 401 this information is subsequently stored in a historical database 403 for future use. During mealtime and/or when patron is mobile, the patron is presented with an interface on mobile app to make real-time preferences on meal interests or desires for food ingestion, the app may ask "for dining, what are you in the mood for?" 402. An analysis (as further exemplified in FIG. 5) is performed on patrons historical and real-time food item requirements and compared to menu options and culinary capabilities of restaurants in proximity of patron 404 from which a consumer specific food item is generated 405. The food item options 406 are displayed to the patron, along with a recommended restaurant, with details such as type of food, food cost, additional drive time 407. A choice is made from the patron 408 for one or more food item displayed with its recommended restaurant. The patron's food item information is sent to the restaurant, confirmation to patron and food item fulfilment 409. Display food item confirmation along with restaurant details including restaurant address, driving, estimated travel time and estimated food item availability 410. Notify and update patron on order status and restaurant fulfilment 411.

FIG. 5 is a flow diagram showing the steps of an exemplary method for an optimized food item recommendation to a particular restaurant patron based upon their preferences and patron profile. Convert patron food item text documents to corresponding word vector 501. Convert restaurant recipe, restaurant ingredient data and culinary preparation skill text documents to corresponding word vectors 502. Using a matrix dimension reduction technique such as principal dimension analysis or others known to those skilled in the art, reduce the input matrix for more effective processing. Compare resultant vectors using semantic term vector space techniques known to one in the art 503. Select restaurant word vector that is most similar to the patron food item requirement 504. Modify restaurant recipe items based on restaurant ingredients, culinary capabilities to most closely align to patron's requirements 505. Output food item description and recipe to patron and restaurant 506.

Figure 6:
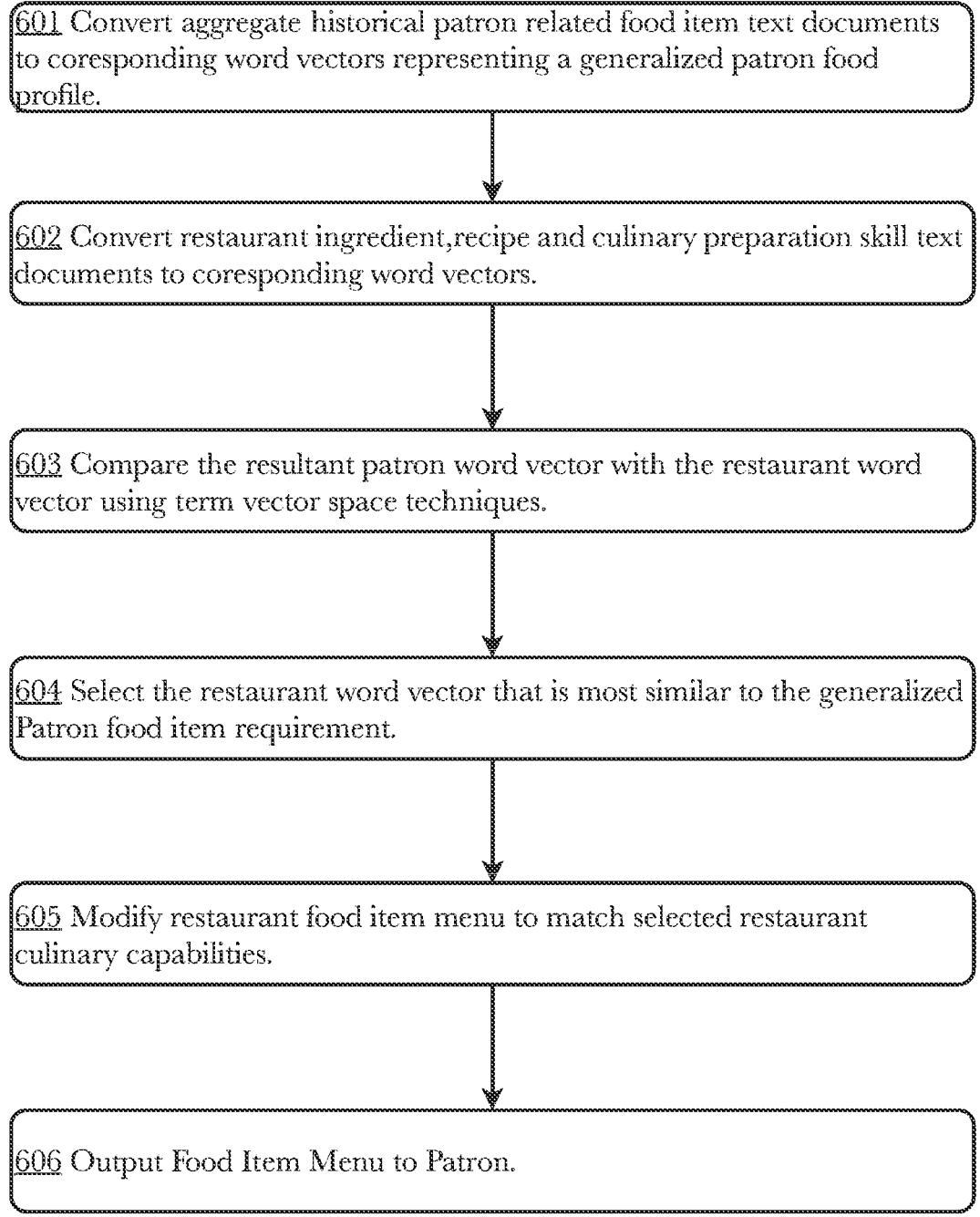
FIG. 6 is a flow diagram showing the steps of an exemplary method for an optimized food item recipe generation process based on the restaurants' food ingredients on hand, culinary skills and a predicted patron preference.

FIG. 6 is a flow diagram showing the steps of an exemplary method for an optimized food item based on the restaurants' food ingredients on hand, culinary skills and a predicted preference of a patron. Convert aggregate historical patron food item text documents to corresponding word vectors to represent generalized patron food profile 601. Convert restaurant recipe and culinary preparation text documents to corresponding word vectors 602. Compare resultant vectors using term vector space techniques 603. Select restaurant word vector that is most similar to the generalized patron food item requirement 604. Modify restaurant recipe items based on restaurant ingredients, culinary capabilities to most closely align to generic patron's requirements 605. Output food item menu to patron 606.

An exemplary semantic comparison method may include term vector space analysis technique to those familiar in the art. Term vector modeling is an algebraic model for representing text and text documents as vectors. Each term or word in a text document typically corresponds to a dimension in that vector. Once a text document is described as a word vector, comparisons between two vectors may be made using vector calculus. One useful technique to determine similarities between documents is by comparing the deviation of angles between each document vector and the original query vector where the query is represented as a vector with same dimension as the vectors that represent the other documents.

An exemplary dimensional reduction technique familiar to those skilled in the art is Principal Component Analysis ("PCA"), which may be used to optimize the variables prior to vectorization to reduce dimensionality of resulting vectors prior to feeding into a machine learning algorithm.

An exemplary recipe optimization method may include deep learning techniques familiar to those skilled in the art. One such form of deep learning that is particularly useful when generating text is Recurrent Neural Networks ("RNN") using long short-term memory ("LSTMs") units or cells. A single LSTM is comprised of a memory-containing cell, an input gate, an output gate and a forget gate. The input and forget gate determine how much of incoming values transit to the output gate and the activation function of the gates is usually a logistic function. The initial input data will cause the model to learn the weights of connections that influence the activity of these gates which will impact the resultant output. To generate unique personalized recipes for a given patron, standard recipes along with the patron profile data are fed into the input gate of the RNN, in turn the RNN will learn what's important to the patron and create unique recipe outputs.

Figure 11:
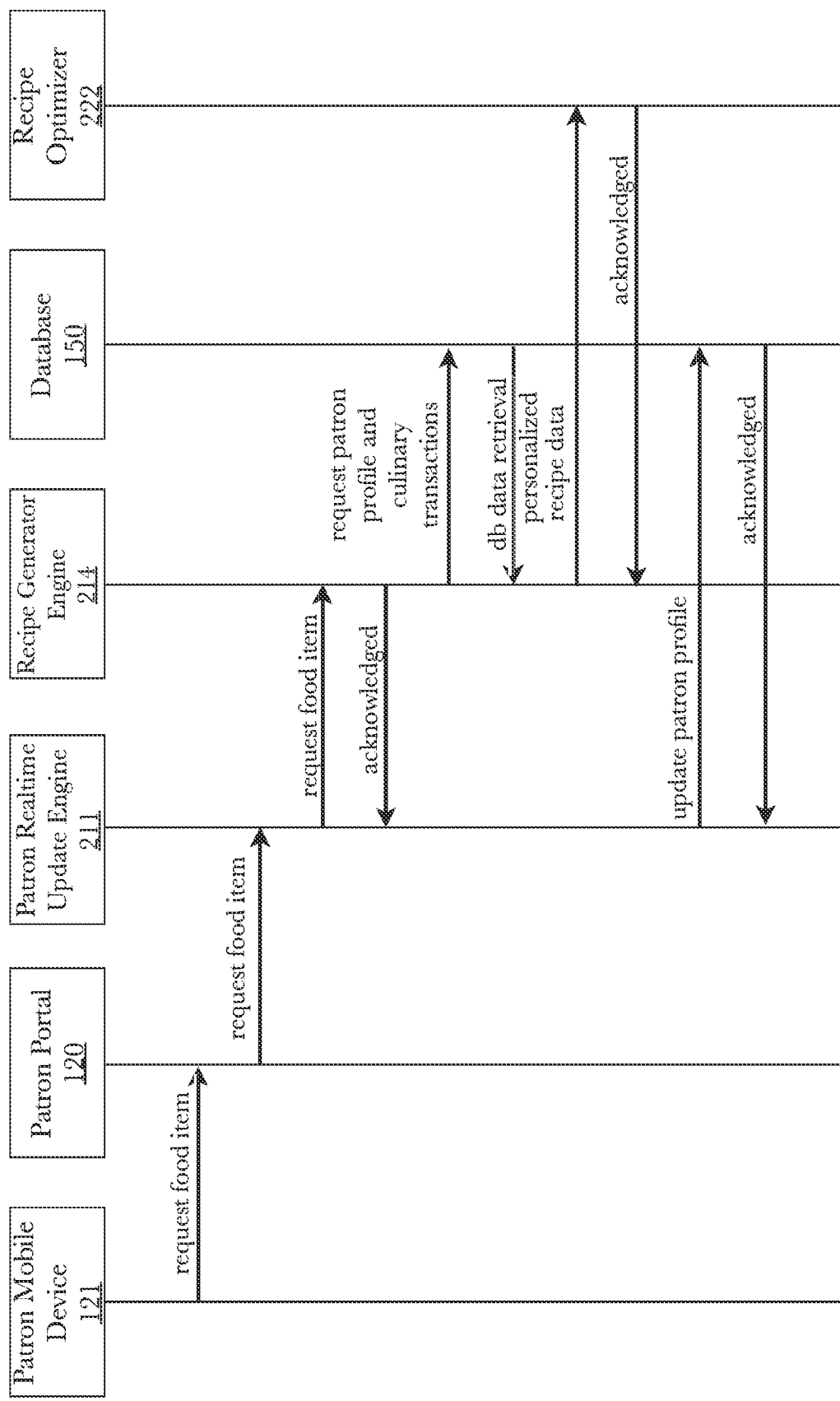
FIG. 11 is a message diagram showing exemplary messaging between patron device and recipe generation system with output to the recipe optimization system.

FIG. 11 is a message diagram showing exemplary messaging between patron device 110 and recipe generation system with output to the recipe optimizer 222. Initially, a patron device 110 connects to a patron portal 120 to submit a food item request. The request may then be relayed by the patron portal 120 to a patron realtime update engine 211, which then relays the request to a recipe generator engine 214 and updates the patron's profile in a database 150. Recipe generator engine 214 acknowledges the request and retrieves stored patron profile and previous culinary transactions from the database 150, and uses this information to generate personalized recipe data for the specific patron that is then sent to the recipe optimizer 222.

Figure 12:
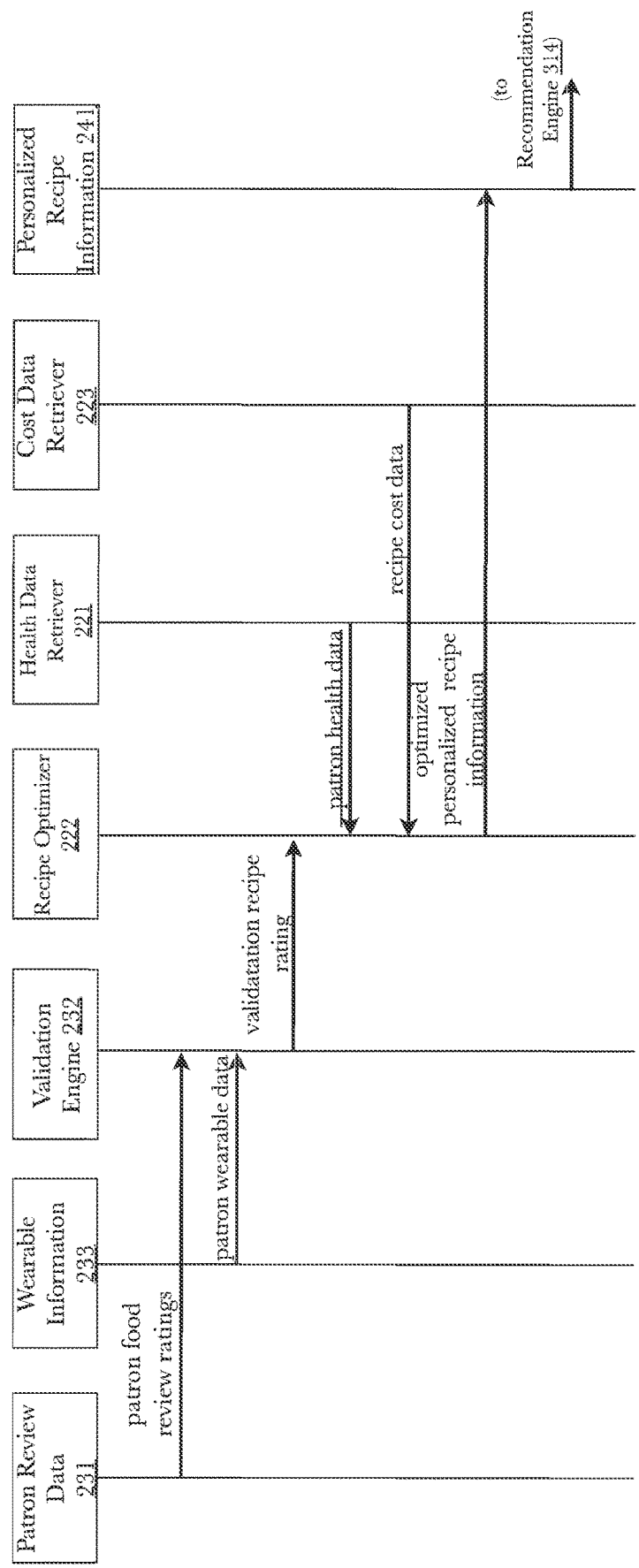
FIG. 12 is a message diagram showing exemplary messaging within the recipe optimization system taking inputs from a recipe generation system and a recipe validation system and providing an optimized personalized recipe information as an output to restaurant recommendation system.

FIG. 12 is a message diagram showing exemplary messaging within the recipe optimization system taking inputs from a recipe generation system and a recipe validation system and providing an optimized personalized recipe information as an output to restaurant recommendation system. Patron review data 231, submitted by patrons, and patron wearable data 233, transmitted by wearable devices patrons may be wearing, are received at a validation engine 232. Validation engine 232 uses this information to produce a validated recipe rating that is sent to a recipe optimizer 222, which then retrieves patron health data and cost data associated with the recipe (for example, ingredient costs and prep times) using health data retriever 221 and cost data retriever 223, respectively. This information is used to further adjust the recipe and produce personalized recipe information 241, which is then sent as output to a recommendation engine 314.

Figure 13:
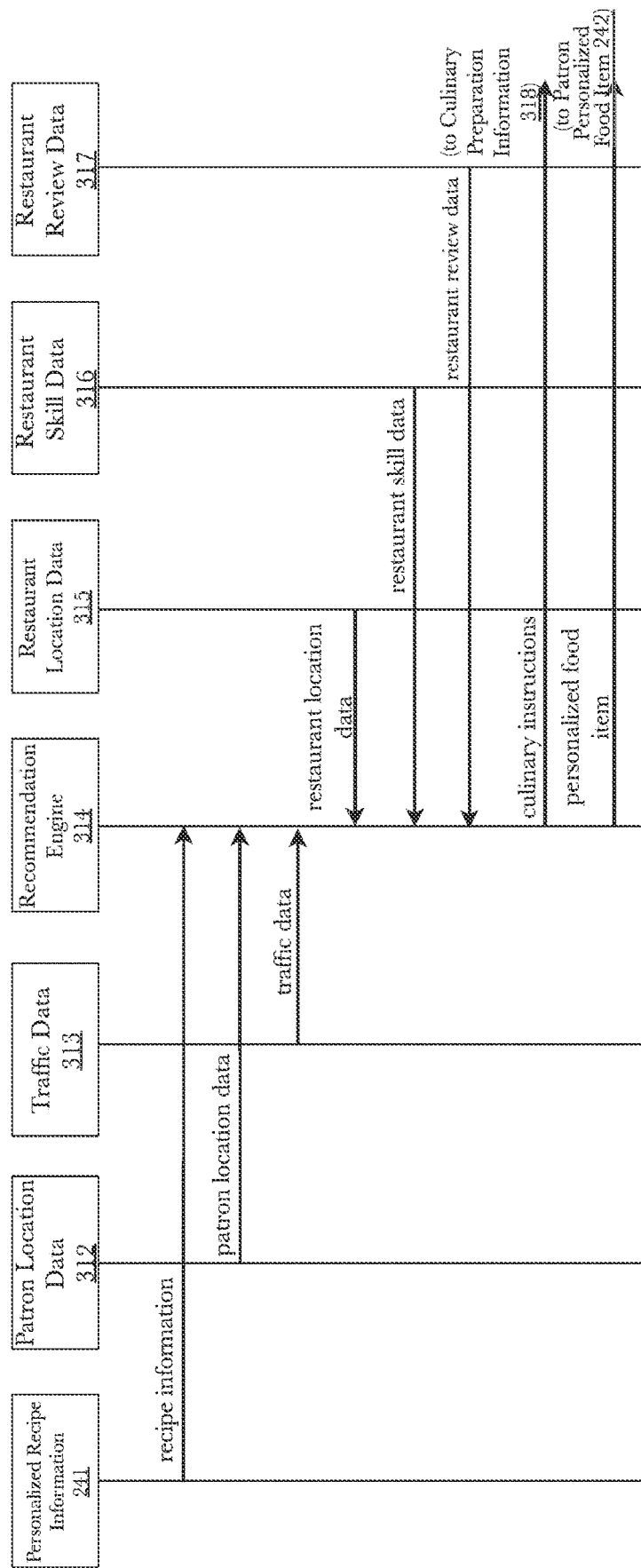
FIG. 13 is a message diagram showing exemplary messaging within a restaurant recommendation system with various inputs and providing culinary preparation and personalized food item output information.

FIG. 13 is a message diagram showing exemplary messaging within a restaurant recommendation system with various inputs and providing culinary preparation and personalized food item output information. Personalized recipe information 241 is received at a recommendation engine 314 from a recipe optimizer 222, as described above (with reference to FIG. 12). Recommendation engine 314 also receives information from a number of sources to assist with producing a specific recipe recommendation, including (but not limited to) patron location data 312, traffic data 313, restaurant location data 315, restaurant skill data 316 (such as the skills of individual chefs that are working at the time), and restaurant review data 317. This aggregated information may then be used to produce a patron-specific personalized food item 242, along with a set of culinary instructions for preparing the patron-specific item that may be sent as culinary preparation information 318.

Figure 17:
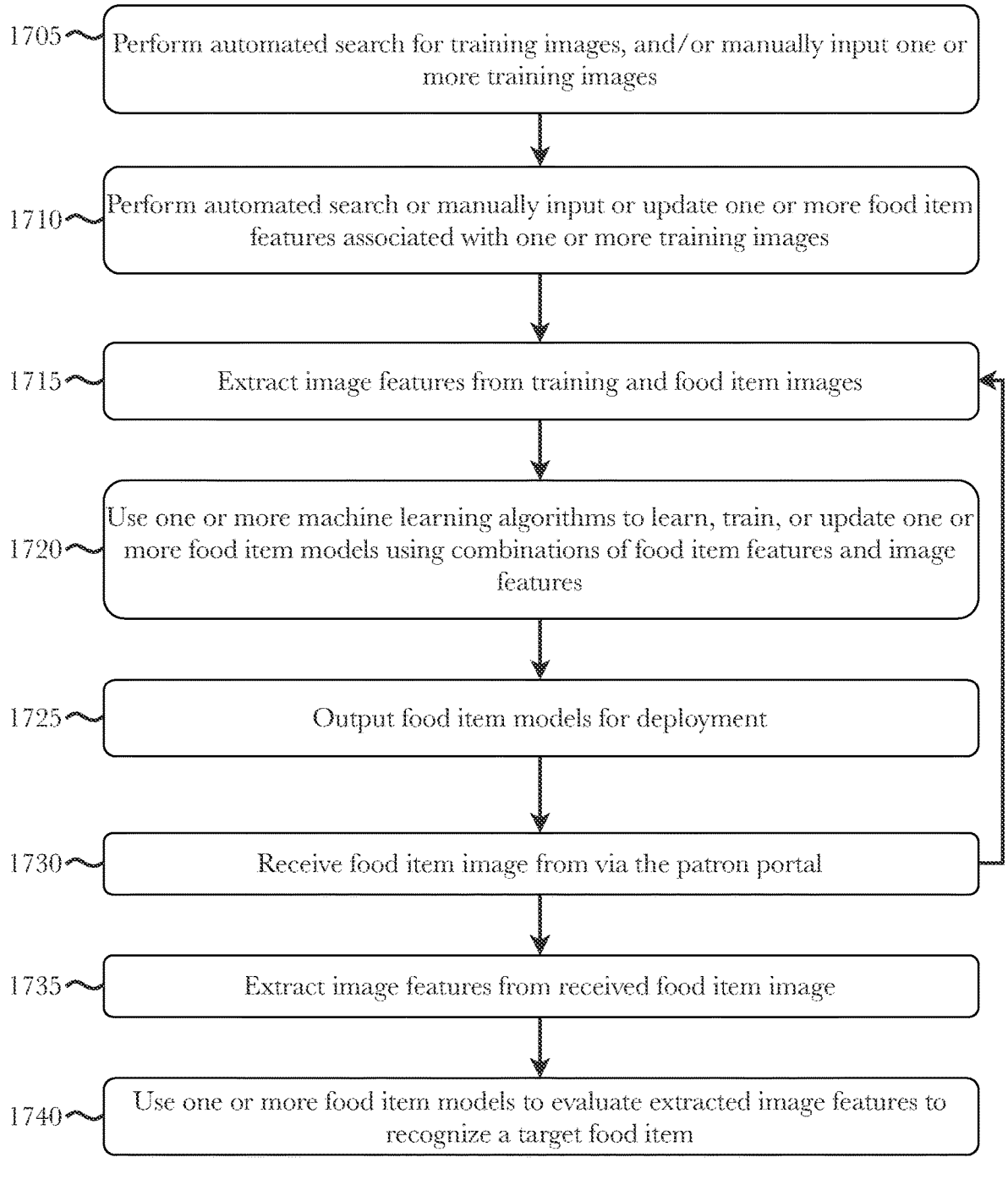
FIG. 17 is a flow diagram of an exemplary method for training one or more food item models and then deploying the one or more food item models during runtime, according to some embodiments.

FIG. 17 is a flow diagram of an exemplary method 1700 for training one or more food item models and then deploying the one or more food item models during runtime, according to some embodiments. The first step 1705 of the process is to perform a search, which could be done automatically and/or manually, to input one or more training images. The obtained training images may be stored in a training images database 1503. As a next step, 1710 the system 1400 may perform an automated and/or manual search to input or update one or more food item features associated with one or more training images. Examples of non-limiting food item features can include, nutrition information, menu, recipe, source, common substitutions, preparation techniques, etc. Food item features may be stored in a food item feature database 1502. It should be noted that step 1710 may be performed simultaneously as step 1705. For example, as each new training image is input at step 1705, the food item feature associated with the new training image may be updated as the next new training image is added to the training images dataset. As a next step, 1715 food image engine 1500 may extract image features from training and food item images. Examples of non-limiting types of features that may be extracted include, color, histogram of oriented gradients, scale-invariant feature transforms, local binary patterns, texton histograms, and the like. At step 1720, the food image engine 1500 may use one or more machine learning algorithms to learn, train, or update one or more food item models using combinations of food item features and image features. As a last step for the training process 1725, the created food item models may be output and ready for deployment in a runtime situation.

The output food item models may then be used to recognize food items that appear in a submitted food item image. The deployment process begins at step 1730 when system 1400 receives a food item image from a patron. This received image may be added to the training images dataset and its extracted features may be used in the next iteration of food item model development, thereby allowing the food item models to grow and become more robust over time as new food item images are submitted to the food image engine 1500. At step 1735, food image engine 1500 may extract image features from the received food item image and then use the deployed one or more food item models to evaluate the extracted image features to recognize a target food item appearing in the food item image. Not shown, but a next step may involve saving the target food item to database 150 and then sending the target food item to the patron who submitted the food item image for confirmation or rejection by the patron.

Figure 18:
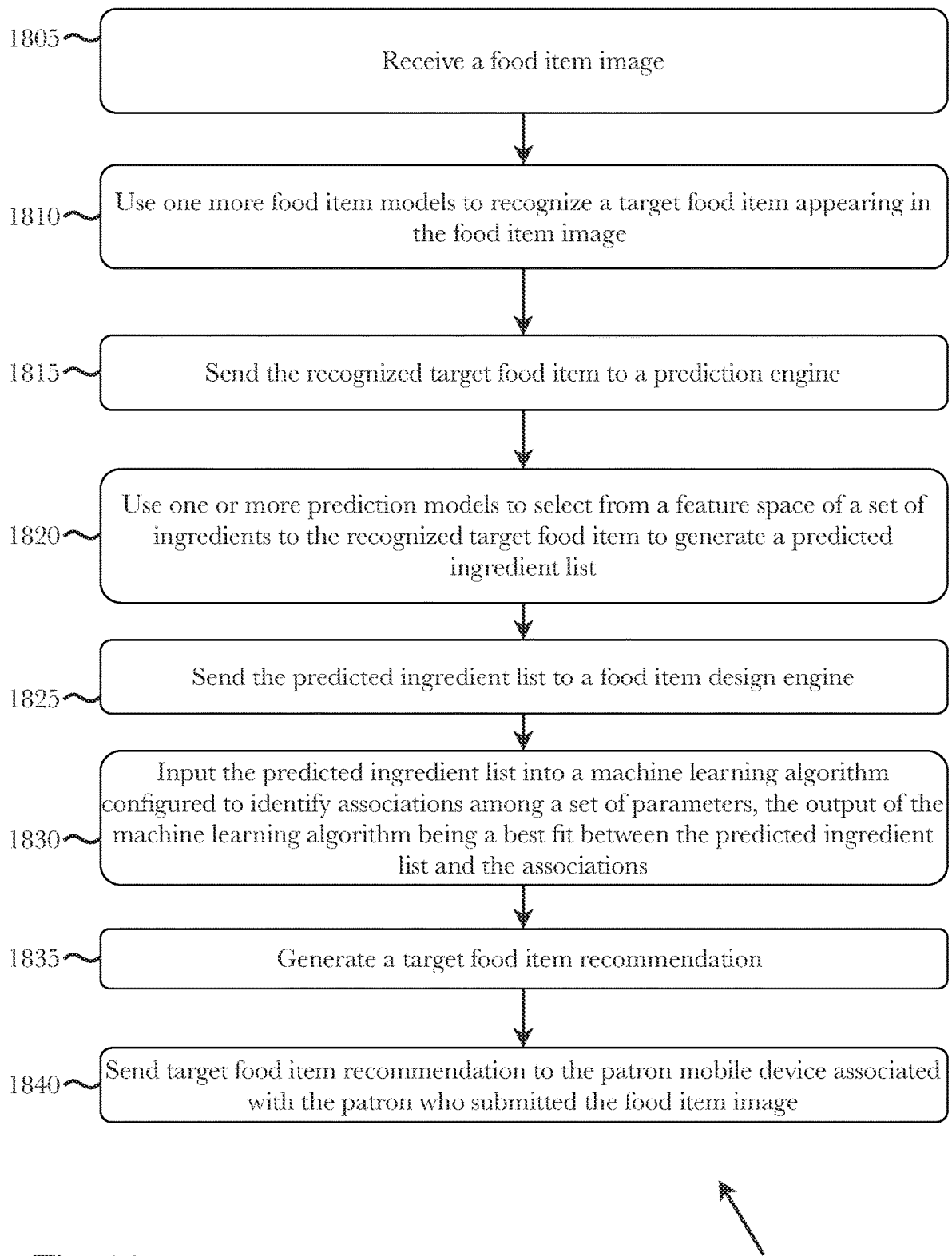
FIG. 18 is a flow diagram of an exemplary method for performing image-based food item search, design, and fulfillment, according to some embodiments.

FIG. 18 is a flow diagram of an exemplary method 1800 for performing image-based food item search, design, and fulfillment, according to some embodiments. The first step 1805 occurs when IFSDF system 1400 receives a food item image. The food item image may be submitted by a patron who wishes to eat the food item appearing in the image. At the next step 1810, food image engine 1500 may use one or more food item models to recognize a target food item appearing in the food item image. Once recognized, the next step 1815 is to send the recognized food target food item to prediction engine 1600. At the prediction engine 1600, the next step 1820 is to use one or more prediction models to select from a feature space of a set of ingredients to the recognized target food item to generate a predicted ingredient list. The next step 1825 is to send the predicted ingredient list to food item design engine 200. At the food item design engine 200, the next step 1830 is to input the predicted ingredient list into a machine learning algorithm that is configured to identify associations among a set of parameters. The output of the machine learning algorithm is a best fit between the predicted ingredient list and the associations. Using the best fit, food item design engine 200 may generate a target food item recommendation 1835. As a last step 1840, the target food item recommendation may be sent to the patron mobile device associated with the patron who submitted the food item image. The target food item recommendation may comprise the name and location of a restaurant where the target food item may be prepared in accordance with the patron's preferences.

Figure 19:
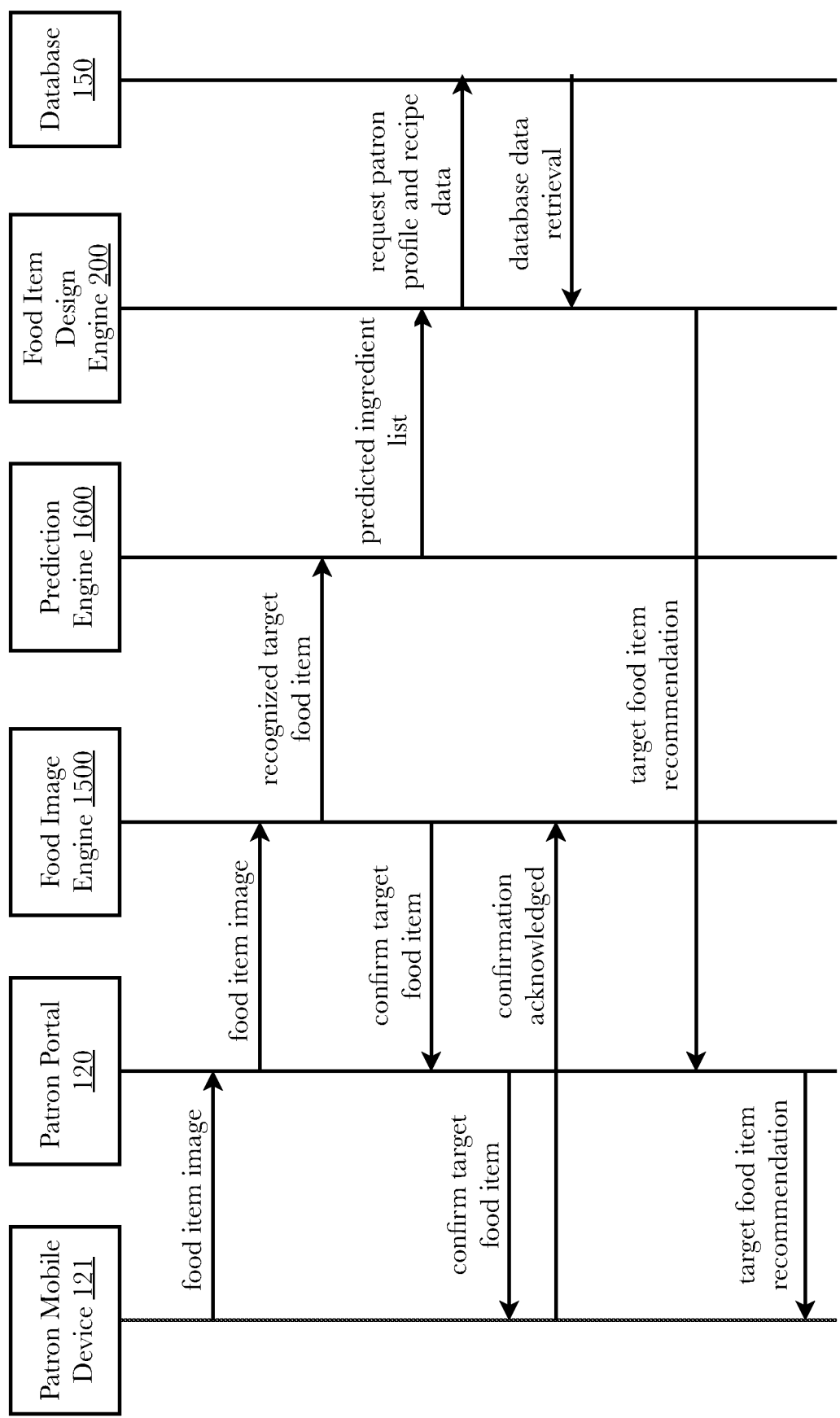
FIG. 19 is a message diagram showing exemplary messaging between patron mobile device and IFSDF system.

FIG. 19 is a message diagram showing exemplary messaging between patron mobile device 121 and IFSDF system 1400. According to some embodiments, initially a patron device 121 connects to a patron portal 120 to submit a food item image. The food item image may then be relayed by the patron portal 120 to food item engine 1500, which then processes the food item image to output a recognized target food item. At this point, according to some embodiments, the target food item may be sent to the patron mobile device 121 via the patron portal 120. The patron mobile device user may then acknowledge the target food item as correct or incorrect and relay their acknowledgement back to food image engine 1500 via the patron portal 120. The recognized target food item may then be relayed to prediction engine 1600 which analyzes the recognized target food item in order to output a predicted ingredient list. The predicted ingredient list may be forwarded to food item design engine 200. Food item design engine may request (e.g., receive, retrieve, or otherwise obtain) patron profile data and recipe data from database 150 which may be configured to store patron preferences in patron profile, and may also be configured to store a plurality of recipe data as well as restaurant data. The database 150 receives the request and passes the required data back to food item design engine 200. Using the requested data and the predicted ingredient list, food item design engine 200 may generate a target food item recommendation for the patron who submitted the food item image. The target food item recommendation may be passed to the patron mobile device 121 via the patron portal 120, wherein the patron may act on the target food item recommendation.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 7:
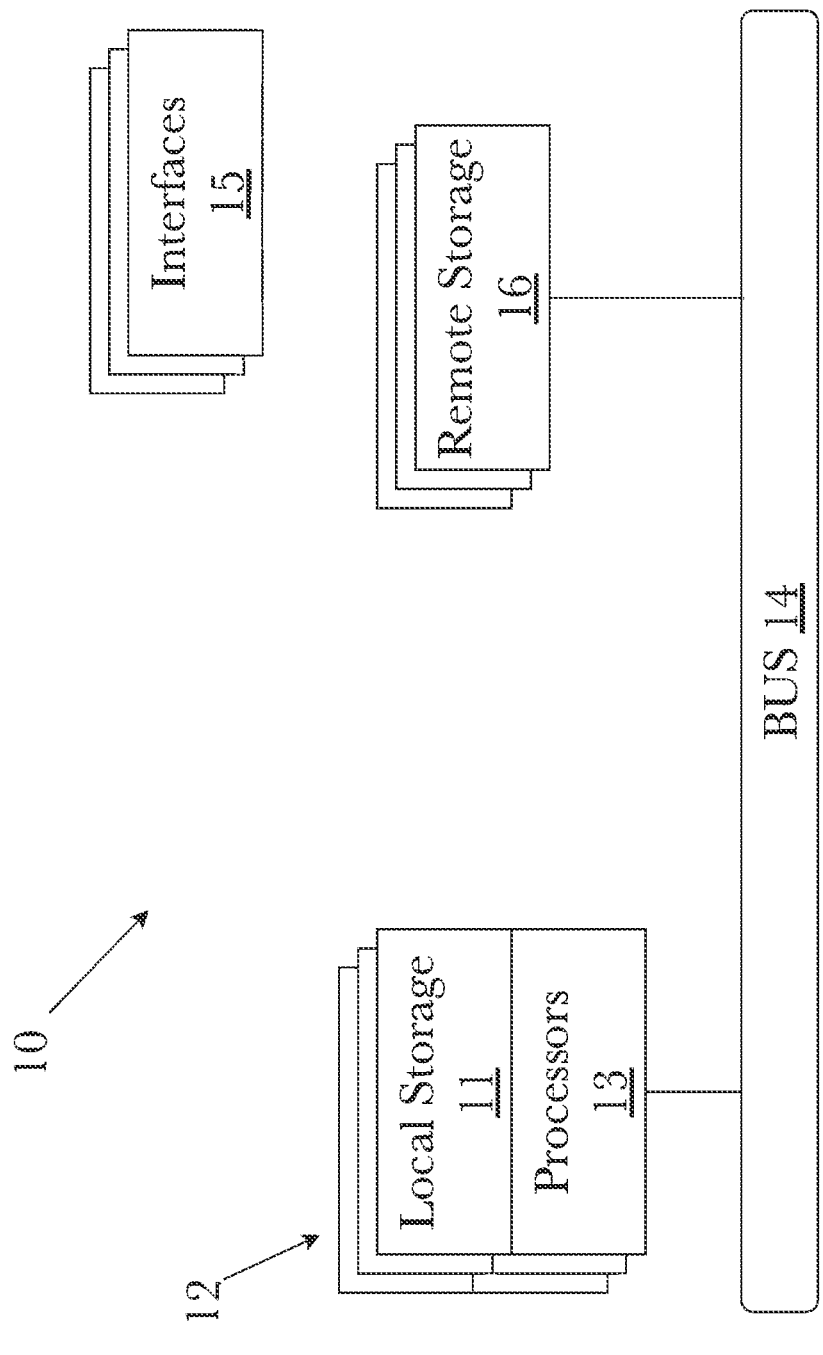
FIG. 7 is a block diagram illustrating an exemplary hardware architecture of a computing device.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
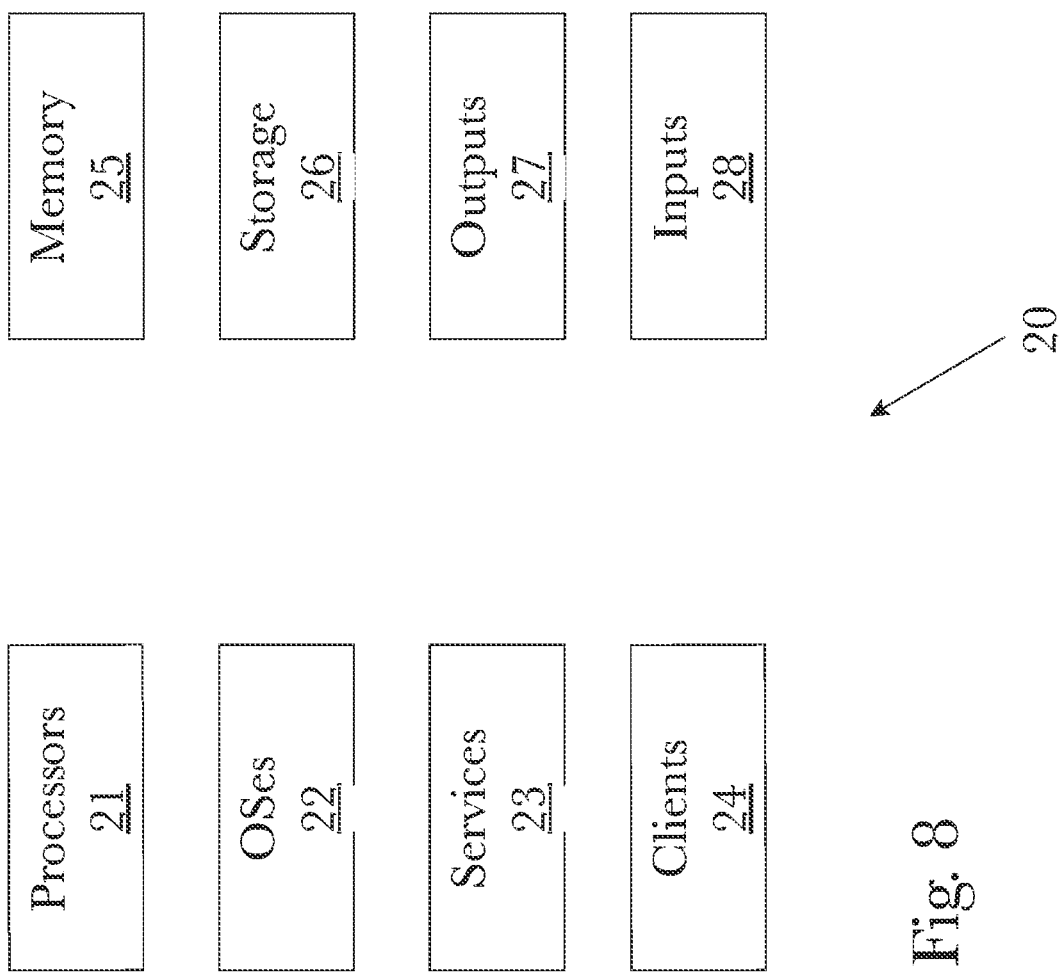
FIG. 8 is a block diagram illustrating an exemplary logical architecture for a client device.

In some aspects, systems may be implemented on a standalone computing system. Referring now to FIG. 8, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 9:
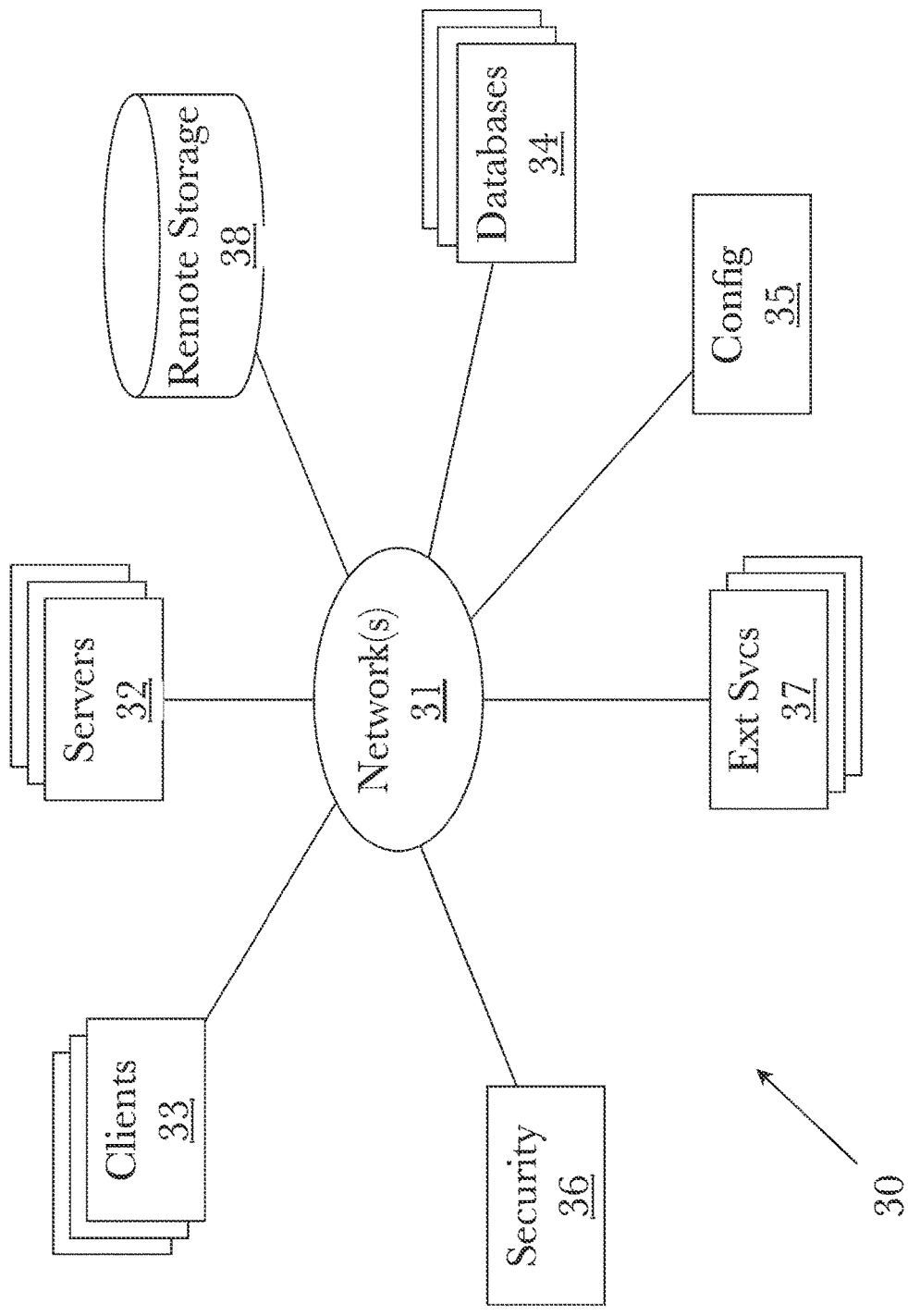
FIG. 9 is a block diagram showing an exemplary architectural arrangement of clients, servers, and external services.

In some aspects, systems may be implemented on a distributed computing network, such as one having any number of clients and/or servers. Referring now to FIG. 9, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 10:
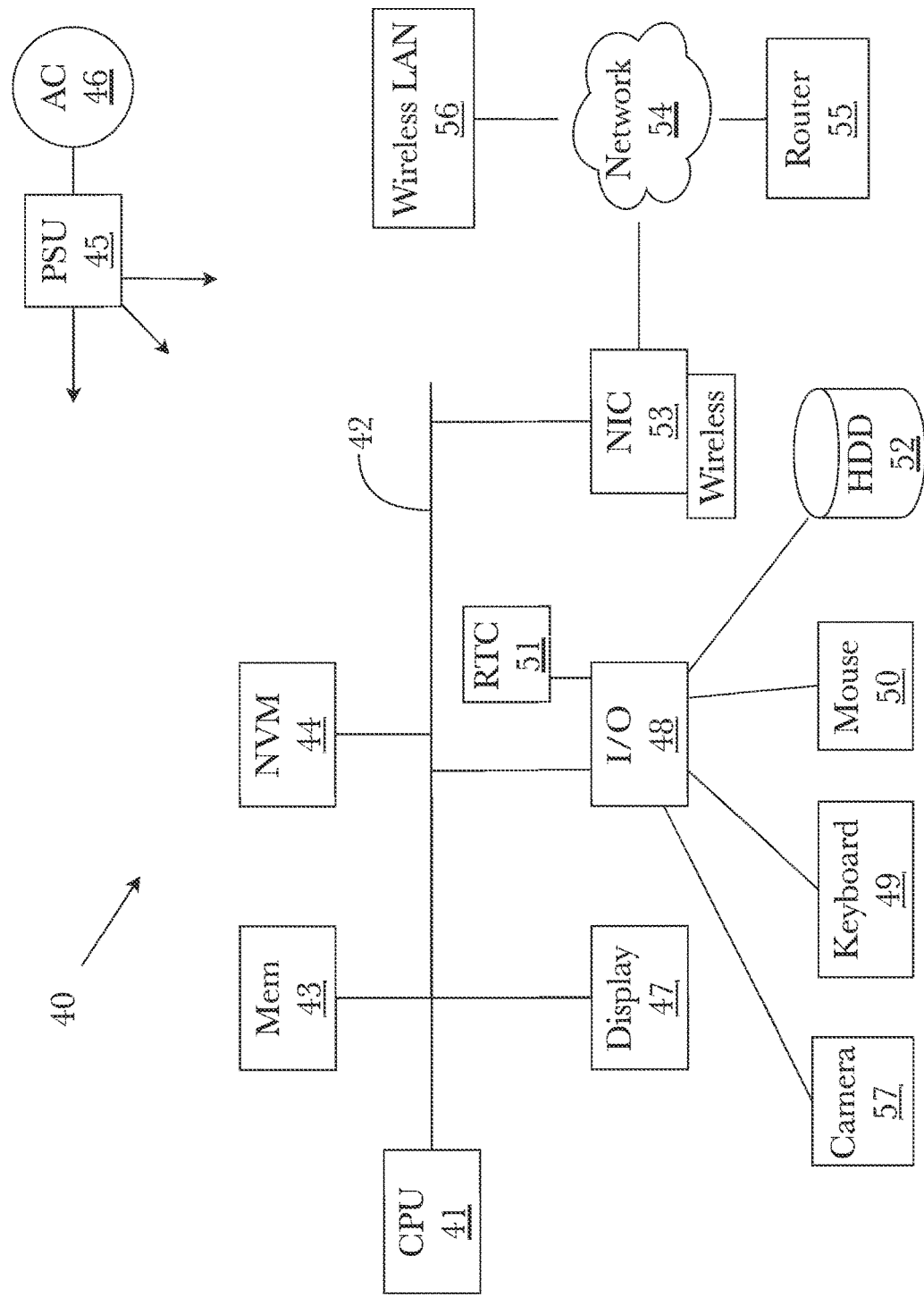
FIG. 10 is block diagram illustrating another aspect of an exemplary hardware architecture of a computing device.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with a system of any particular aspect, and such modules may be variously implemented to run on server and/or client components.

According to an aspect, restaurant menu optimization and experimentation may be performed with a patron who enters a restaurant with a known patron profile. The system may predict and offer highly desirable "chefs specials" that satisfies the patron preferences by making variations of known dishes on the restaurant menu. The "chef's special" are automatically designed by system and may include Artificial Intelligent methods familiar to those skilled in the art.

According to another aspect, restaurant menu optimization and experimentation may be performed with a patron who enters a restaurant with an unknown patron profile. The system may predict and offer highly desirable "chefs specials" that provide A/B experimentation by making variations of known dishes on the restaurant menu and then by tuning the menu to provide an optimal patron menu. The "chef's special" are automatically designed by system and may include Artificial Intelligent methods familiar to those skilled in the art.

According to another aspect, recipe optimization may be performed on multiple patrons at the same time as may be the case for dining parties of two or more at a restaurant. For example, in a party of four seated at the same table, of whom three have profile information available to system, and one with a raspberry allergy and one is gluten intolerant. The system may predict and offer highly desirable "chefs specials" that satisfy each person's preferences amongst those whom food preferences are known while avoiding allergic ingredients for the whole table. The "chef's special" may include Artificial Intelligent methods familiar to those skilled in the art.

According to another aspect, patron wearable devices may provide real-time feedback directly into the food design system. For example, a Continuous Glucose Monitor (GCM) may provide input into the recipe device, and based on patron current glucose level offer additional/different options for a choice of dessert and/or menu options for future meals.

According to another aspect, a home food inventory system may be used as input into a recipe generator to provide food preparation options based on current in home food inventory.

The skilled person will be aware of a range of possible modifications of the various aspects described above. Accordingly, the present invention is defined by the claims and their equivalents.

What is claimed is:
1. A system for image-based food item search, design and culinary fulfillment, comprising:
a computing device comprising a memory, a processor, and a non-volatile data storage device;
a recipe database stored on the non-volatile data storage device, the recipe database comprising a plurality of recipes, each recipe comprising a food type, a first list of required ingredients and a first required culinary skill;
a patron profile database stored on the non-volatile data storage device, the patron profile database comprising a plurality of patron profiles, each patron profile comprising:
a patron preference; and
a patron review for one or more target food item recommendations, each target food item recommendation comprising a second list of required ingredients and a second required culinary skill;
a first machine learning algorithm configured to identify associations among the patron preferences, the first lists of required ingredients, and the first required culinary skills;
a food image engine comprising a first plurality of programming instructions stored in the memory which, when operating on the processor, causes the computing device to:
obtain a food item image;
process the food item image to extract image features;
input the extracted image features into a second machine learning algorithm configured to recognize and output a target food item based on the image features; and
send the output target food item to a prediction engine; and
a prediction engine comprising a second plurality of programming instructions stored in the memory which, when operating on the processor, causes the computing device to:
receive the target food item;
identify and extract a set of features associated with the target food item;
input the identified set of features associated with the target food item into a third machine learning algorithm configured to predict a match from a hypothesis space of the set of source ingredients to the received target food item;
output a predicted ingredient list comprising a set of source ingredients and their proportions; and
send the predicted ingredient list to a food item design engine; and
a food item design engine comprising a third plurality of programming instructions stored in the memory which, when operating on the processor, causes the computing device to:
convert the patron preferences, recipes, food items, and patron reviews to a first set of vector representations;
pass the vector representations through the first machine learning algorithm to identify associations among the patron preferences, the first lists of required ingredients, and the first required culinary skills;
receive a predicted ingredient list from the prediction engine;
convert the predicted ingredient list to a second set of vector representations;
pass the second set of vector representations through a fourth machine learning algorithm to obtain a best fit between the predicted ingredient list and the identified associations, the best fit comprising a third required list of ingredients and a third culinary skill; and generate a target food item recommendation from the best fit.

2. The system of claim 1, wherein the patron profile is updated with a patron review of the target food item recommendation received from the user.

3. The system of claim 1, wherein the patron preference is based on social media information retrieved from a social media network.

4. The system of claim 1, wherein the patron preference is based on nutritional data retrieved from a third-party resource over a network.

5. The system of claim 4, wherein the nutritional data comprises allergy information.

6. The system of claim 1, wherein the second machine learning algorithm is used to construct a food item model; and
wherein the food item model is configured to recognize and output a target food item based on the image features.

7. The system of claim 1, wherein the third machine learning algorithm is used to construct a prediction model; and
wherein the prediction model is configured to predict a match from the hypothesis space of the set of source ingredients to the received target food item.

8. A method for image-based food item search, design and culinary fulfillment, comprising the steps of:
storing a recipe database on a non-volatile data storage device of a computing device comprising a memory, a processor, and the non-volatile data storage device, the recipe database comprising a plurality of recipes, each recipe comprising a food type, a first list of required ingredients and a first required culinary skill;
storing a patron profile database stored on the non-volatile data storage device, the patron profile database comprising a plurality of patron profiles, each patron profile comprising:
a patron preference; and
a patron review for one or more food item recommendations, each food item recommendation comprising a second list of required ingredients and a second required culinary skill;
configuring a first machine learning algorithm to identify associations among the patron preferences, the first lists of required ingredients, and the first required culinary skills;
using a food image engine operating on the computing device to:
obtaining a food item image;
processing the food item image to extract image features;
inputting the extracted image features into a second machine learning algorithm configured to recognize and output a target food item based on the image features;
sending the output target food item to a prediction engine;
using a prediction engine operating on the computing device to:
receiving the target food item;
identifying and extract a set of features associated with the target food item;
inputting the identified set of features associated with the target food item into a third machine learning algorithm configured to predict a match from a hypothesis space of the set of source ingredients to the received target food item;
outputting a predicted ingredient list comprising a set of source ingredients and their proportions;
sending the predicted ingredient list to a food item design engine;
using a prediction engine operating on the computing device to:
converting the patron preferences, recipes, food items, and patron reviews to a first set of vector representations;
passing the vector representations through the first machine learning algorithm to identify associations among the patron preferences, the first lists of required ingredients, and the first required culinary skills;
receiving a predicted ingredient list from the prediction engine;
converting the predicted ingredient list to a second set of vector representations;
passing the second set of vector representations through a fourth machine learning algorithm to obtain a best fit between the predicted ingredient list and the identified associations, the best fit comprising a third required list of ingredients and a third culinary skill; and
generating a target food item recommendation from the best fit.

9. The method of claim 8, wherein the patron profile is updated with a patron review of the food item recommendation received from the user.

10. The method of claim 8, wherein the patron preference is based on social media information retrieved from a social media network.

11. The method of claim 8, wherein the patron preference is based on nutritional data retrieved from a third-party resource over a network.

12. The method of claim 11, wherein the nutritional data comprises allergy information.

13. The method of claim 8, wherein the second machine learning algorithm is used to construct a food item model; and
wherein the food item model is configured to recognize and output a target food item based on the image features.

14. The method of claim 8, wherein the third machine learning algorithm is used to construct a prediction model; and
wherein the prediction model is configured to predict a match from the hypothesis space of the set of source ingredients to the received target food item.

* * * * *